United States Patent
Douillard et al.

(10) Patent No.: US 11,302,011 B2
(45) Date of Patent: *Apr. 12, 2022

(54) PERSPECTIVE CONVERSION FOR MULTI-DIMENSIONAL DATA ANALYSIS

(71) Applicant: Zoox, Inc., Foster City, CA (US)

(72) Inventors: Bertrand Robert Douillard, Palo Alto, CA (US); Subhasis Das, Menlo Park, CA (US); Zeng Wang, Menlo Park, CA (US); Dragomir Dimitrov Anguelov, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/802,112

(22) Filed: Feb. 26, 2020

(65) Prior Publication Data
US 2020/0193606 A1    Jun. 18, 2020

Related U.S. Application Data

(63) Continuation of application No. 15/484,401, filed on Apr. 11, 2017, now Pat. No. 10,593,042.

(51) Int. Cl.
*G06T 7/11* (2017.01)
*G06K 9/62* (2022.01)
(Continued)

(52) U.S. Cl.
CPC ............... *G06T 7/11* (2017.01); *G01S 17/89* (2013.01); *G01S 17/931* (2020.01);
(Continued)

(58) Field of Classification Search
CPC ........ G06K 9/002; G06K 9/6269; G06T 7/10; G06T 3/0037; G06T 2207/20084; G06T 7/0079; G06T 9/00; G06N 3/00
See application file for complete search history.

(56) References Cited

U.S. PATENT DOCUMENTS

| 8,259,994 B1 * | 9/2012 | Anguelov | G06K 9/00664 |
| | | | 382/100 |
| 8,948,501 B1 * | 2/2015 | Kim | G06K 9/00711 |
| | | | 382/159 |

(Continued)

*Primary Examiner* — Fayyaz Alam
(74) *Attorney, Agent, or Firm* — Lee & Hayes, P.C.

(57) ABSTRACT

Multi-dimensional data can be mapped to a projection shape and converted for image analysis. In some examples, the multi-dimensional data may include data captured by a LIDAR system for use in conjunction with a perception system for an autonomous vehicle. Converting operations can include converting three-dimensional LIDAR data to multi-channel two-dimensional data. Data points of the multi-dimensional data can be mapped to a projection shape, such as a sphere. Characteristics of the projection shape may include a shape, a field of view, a resolution, and a projection type. After data is mapped to the projection shape, the projection shape can be converted to a multi-channel, two-dimensional image. Image segmentation and classification may be performed on the two-dimensional data. Further, segmentation information may be used to segment the three-dimensional LIDAR data, while a rendering plane may be positioned relative to the segmented data to perform classification on a per-object basis.

20 Claims, 16 Drawing Sheets

(51) Int. Cl.
    *G06T 19/20*    (2011.01)
    *G01S 17/89*    (2020.01)
    *G01S 17/931*   (2020.01)
    *G06V 10/44*    (2022.01)

(52) U.S. Cl.
    CPC ............ *G06K 9/6267* (2013.01); *G06T 19/20* (2013.01); *G06V 10/44* (2022.01); *G06T 2207/10028* (2013.01)

(56) References Cited

U.S. PATENT DOCUMENTS

| | | | |
|---|---|---|---|
| 9,280,825 B2* | 3/2016 | Huang | G06T 7/73 |
| 9,633,483 B1* | 4/2017 | Xu | G06T 17/10 |
| 9,754,490 B2* | 9/2017 | Kentley | G05D 1/0088 |
| 2013/0282208 A1* | 10/2013 | Mendez-Rodriguez | G01S 17/89 |
| | | | 701/16 |
| 2015/0284010 A1* | 10/2015 | Beardsley | G08G 1/22 |
| | | | 701/41 |
| 2016/0253809 A1* | 9/2016 | Cole | H04N 13/139 |
| | | | 345/672 |
| 2018/0131924 A1* | 5/2018 | Jung | H04N 13/257 |
| 2019/0086546 A1* | 3/2019 | Tsishkou | G01S 7/4802 |

* cited by examiner

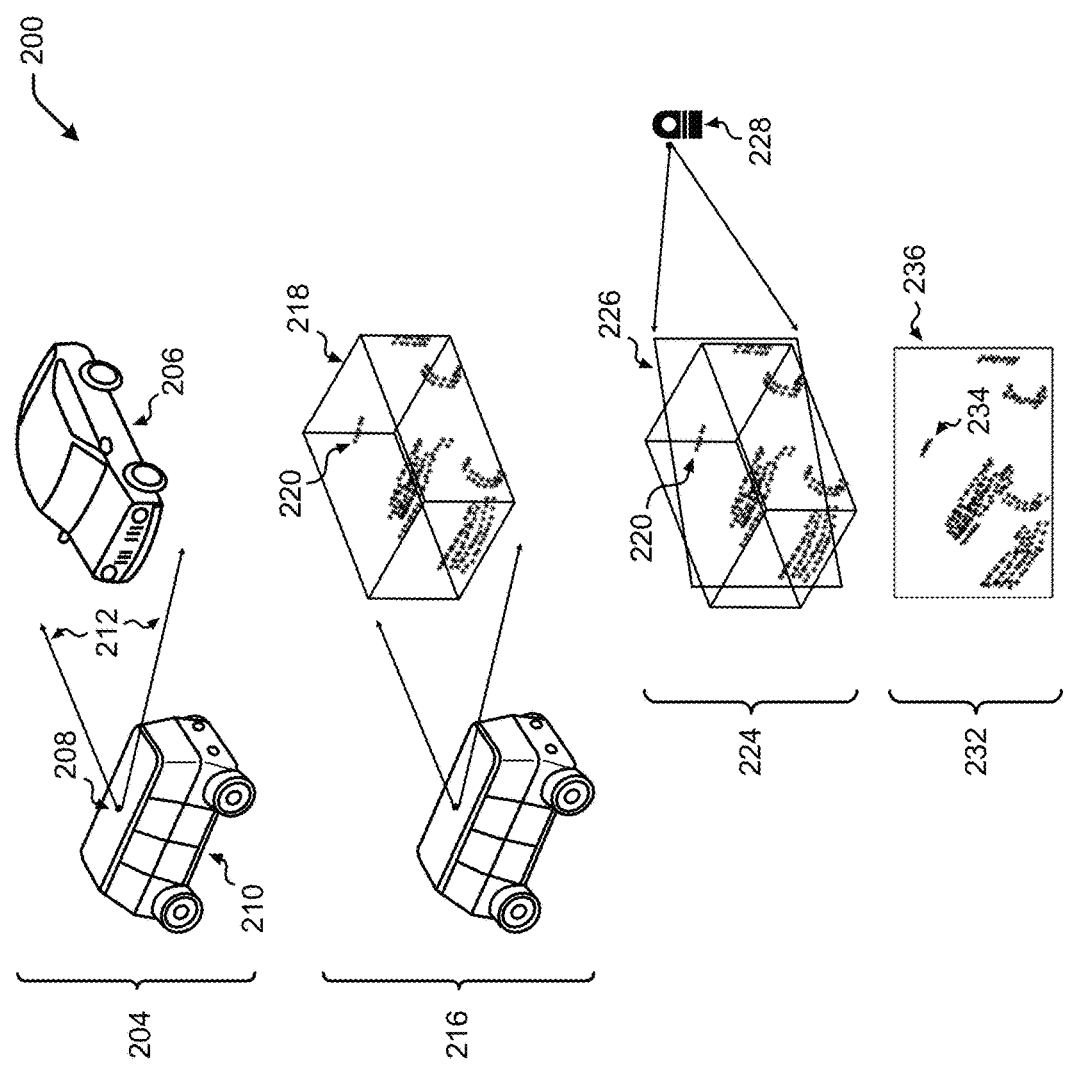
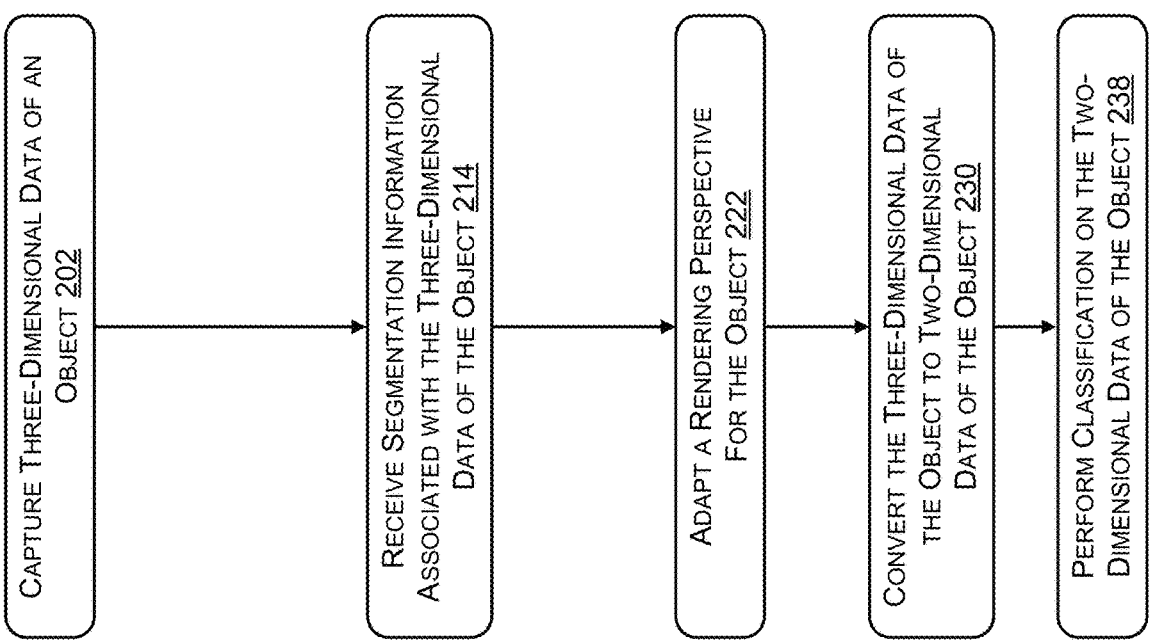
FIG. 2

PERSPECTIVE CONVERSION FOR MULTI-DIMENSIONAL DATA ANALYSIS

CROSS REFERENCE TO RELATED APPLICATIONS

This is a continuation application which claims priority to commonly assigned, co-pending U.S. patent application Ser. No. 15/484,401, filed Apr. 11, 2017. Application Ser. No. 15/484,401 is fully incorporated herein by reference.

BACKGROUND

Image segmentation is one type of image analysis that is often used for partitioning an image into different segments, or super-pixels, to provide a more meaningful representation of the image. As one example, an image may be segmented so as to uniquely identify objects within the image. Image segmentation on three-dimensional data may use region growing techniques to examine neighboring pixels of initial seed points to determine whether the neighboring pixels should be added to the region. However, in the past, these region growing techniques are often slow and may not provide accurate results.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 illustrates a pictorial flow diagram of an example process for capturing three-dimensional data of an object, receiving segmentation information, adapting a rendering perspective for the object, converting the three-dimensional data of the object to two-dimensional data of the object, and performing classification.

DETAILED DESCRIPTION

Figure 1:
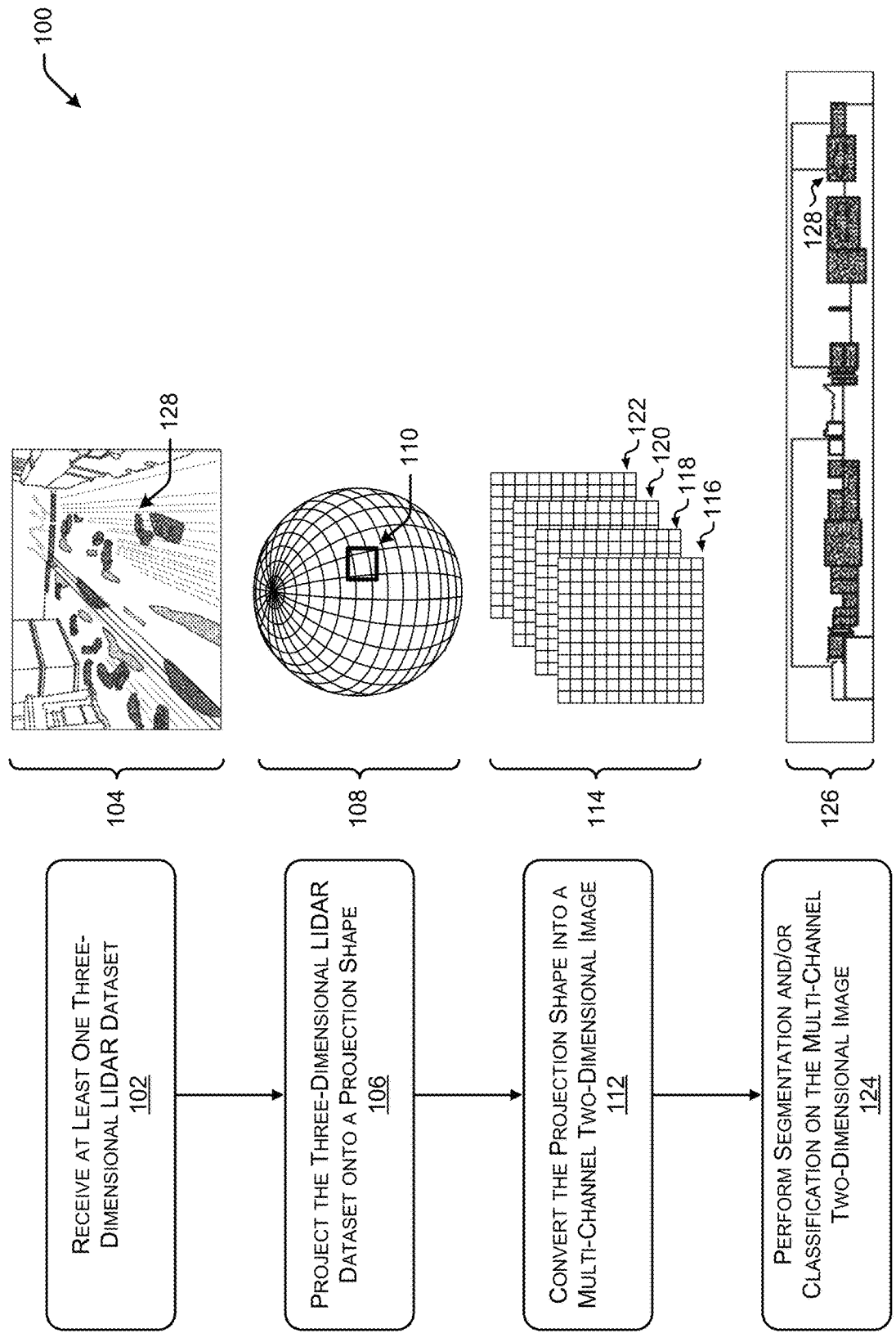
FIG. 1 illustrates a pictorial flow diagram of an example process for converting a three-dimensional LIDAR dataset to a projection shape, converting the projection shape to a multi-channel two-dimensional image, and performing segmentation and/or classification on the resulting multi-channel two-dimensional image.

Three-dimensional data can be used in computer vision contexts to locate and interact with objects in the physical world. Often, an initial step of such computer vision includes segmenting data representing the objects to perform subsequent processing. Previous work on image segmentation has been directed to two-dimensional images, and often algorithms developed for two-dimensional data cannot be adapted for use with three-dimensional data. Thus, converting three-dimensional data to two-dimensions may allow computer vision systems to leverage proven algorithms that have been developed in the context of two-dimensional data.

This disclosure describes methods, apparatuses, and systems for converting multi-dimensional data for image analysis. In some examples, the multi-dimensional data may include data captured by a LIDAR system for use in conjunction with a perception system for an autonomous vehicle. For example, a LIDAR system may have a light emitter and a light sensor, with the light emitter including one or more lasers that direct highly focused light toward an object or surface which reflects the light back to the light sensor. Measurements of the LIDAR system may be represented as three-dimensional LIDAR data having coordinates (e.g., Cartesian, polar, etc.) corresponding to positions or distances captured by the LIDAR system. The converting operations described herein can include converting the three-dimensional LIDAR data to multi-channel two-dimensional data, and performing image segmentation and classification on the two-dimensional data. Subsequently, the segmentation and/or classification information may be used as input for determining a trajectory for the autonomous vehicle, for example.

As mentioned above, the three-dimensional LIDAR data can include a three dimensional map or point cloud which may be represented as a plurality of vectors emanating from a light emitter and terminating at an object or surface. To convert the three-dimensional LIDAR data to two-dimensional data, an example method can include mapping the LIDAR data to a three-dimensional projection shape and converting the projection shape to a two-dimensional plane, while subsequently performing segmentation and/or classification on the two-dimensional data. The projection shape can include, for example, a sphere, cube, cylinder, pyramid, etc., which can be placed (virtually) around the origin of the three-dimensional data. Each vector or point of the point cloud can be mapped to a cell or array of locations associated with the projection shape. In some instances, each cell of the projection shape can include coordinates for one or more vectors passing through the cell, and in some instances, each vector or point of the point cloud can include a range (e.g., distance between the light emitter and a point P of the object or surface) and/or a surface normal vector associated with each point P associated with each LIDAR vector.

The projection shape may include a number of characteristics, such as shape, field of view, resolution, and projection type. For example, shapes of the projection shape may include a sphere, cube, cylinder, pyramid, or any three-dimensional shape. The field of view may constrain an area above or below an origin of the LIDAR data, beyond which the data may be omitted or ignored. For example, for a LIDAR sensor mounted on a roof of an autonomous vehicle, data above a field of view may represent tops of buildings or the sky, and may be ignored for processing. Further, data below a field of view may represent a roof of the autonomous vehicle and may be ignored or used as a fixed reference point to calibrate the LIDAR sensor. Next, a horizontal resolution and a vertical resolution may be selected for each projection shape. For example, a vertical resolution of the projection shape may vary based on an angle of elevation of the LIDAR system. That is, a resolution (e.g., an amount of detail) may increase or decrease depending on a height above a horizon. By way of another example, a horizontal resolution may vary based on a direction of the LIDAR data relative to a direction of travel of the autonomous vehicle. For example, a resolution may be higher in a direction of travel (e.g., in front of a vehicle) and lower in a direction away from the direction of travel (e.g., behind the vehicle). In some instances, a projection type may be associated with converting or mapping the projection shape to a two-dimensional surface. For example, a first projection type may include perspective geometry, which may include projecting data from a cell of the projection shape along a vector emanating from the LIDAR sensor origin to the two-dimensional surface. A second projection type may include orthogonal geometry, which may include projecting data from a cell of the projection shape along a vector orthogonal to the two-dimensional surface receiving the projection. Details of the projection shape are given with respect to FIGS. 6A, 6B, 6C, 6D, and other figures of this disclosure.

As mentioned above, after converting the three-dimensional LIDAR data to two-dimensional data, the operations can include inputting the two-dimensional data into a convolutional neural network (CNN) for segmentation and classification. The CNN may be included in a planning system for an autonomous vehicle to analyze the two-dimensional data to determine free space for generating a trajectory for the autonomous vehicle. While examples herein describe using a CNN, in other examples, other machine learning techniques may additionally or alternatively be used for segmentation and/or classification.

In some instances, after performing segmentation on the two-dimensional data to generate segmentation information, the segmentation information may be applied to the three-dimensional LIDAR data for subsequent processing. For example, the segmentation information may include a segmentation identifier, identification (ID), or tag associated with each point of the point cloud or pixel, and can be applied to the three-dimensional information to identify three-dimensional data associated with an object. As a non-limiting example, all LIDAR points associated with a single object may all have the same ID, whereas LIDAR points associated with different objects may have different IDs. After identifying the object in the three-dimensional data, the three-dimensional data can be converted to two-dimensional data by projecting the three-dimensional data onto a projection plane (also referred to as a rendering plane), which may include adapting or positioning a rendering perspective (e.g., the rendering plane) relative to the object. Conceptually, adapting the rendering perspective to the object can include viewing the three-dimensional data from a virtual perspective, such that the rendering perspective is not constrained by the original location of the LIDAR sensor, for example. In practice, the rendering perspective is selected to maximize a horizontal and/or vertical extent of the three-dimensional segmented data onto the rendering plane. Upon determining the rendering perspective (and the associated rendering plane), the operations can include projecting the three-dimensional segmented data onto the two-dimensional rendering plane, and subsequently, the operations can include performing classification on the flattened two-dimensional data to classify the object represented by the data.

The converting operations and systems described herein can improve a functioning of a computing device by converting data into one or more formats that improves performance of segmentation and/or classification of objects represented in the data. In some instances, the improved converting operations and systems may provide more accurate and/or faster segmentation by converting three-dimensional data into two-dimensional data so that existing machine learning networks and/or algorithms may be applied to the data for segmentation and/or classification. Using the converting operations described herein to determine segmentation information, the operations of applying the segmentation information to three-dimensional data and applying a rendering perspective on a per object basis leads to more accurate and/or faster classification of objects by exposing additional data to a machine learning algorithm. Further, the data conversion described herein may allow for deep learning techniques, which provide improved processing. In some instances, faster and/or more accurate segmentation and/or classification may be utilized in generating a trajectory of an autonomous vehicle, which may improve safety for occupants of an autonomous vehicle. In some instances, the converting operations described herein may reduce memory requirements or reduce an amount of processing by applying machine learning operations (e.g., a convolutional neural network) to simplified (e.g., segmented) data. In some instances, stacking multiple channels of lower-dimensional images (e.g., over time) improves segmentation and/or classification by incorporating temporal information into the operations. These and other improvements to the functioning of the computer are discussed herein.

The methods, apparatuses, and systems described herein can be implemented in a number of ways. Example implementations are provided below with reference to the following figures. Although discussed in the context LIDAR data and/or in the context of an autonomous vehicle, the methods, apparatuses, and systems described herein can be applied to a variety of systems utilizing machine vision. Further, although described in connection with three-dimensional LIDAR data, the methods, apparatuses, and systems described herein are not limited to three-dimensional data, and are not limited to LIDAR data. For example, the methods, apparatuses, and systems may be utilized in a manufacturing assembly line context, or in an aerial surveying context. Further, the datasets may include data from stereoscopic cameras, depth cameras, Radar sensors, etc., and may include any number of layers or channels, which may correspond to any number of dimensions. Additionally, the techniques described herein may be used with real data (e.g., captured using sensor(s)), simulated data (e.g., generated by a simulator), or any combination of the two.

FIG. 1 illustrates a pictorial flow diagram of an example process 100 for mapping a three-dimensional LIDAR dataset to a projection shape, converting the projection shape to a multi-channel two-dimensional image, and performing segmentation and/or classification on the resulting multi-channel two-dimensional image.

At operation 102, the process can include receiving at least one three-dimensional LIDAR dataset. In some instances, the operation 102 may include receiving a plurality of LIDAR datasets from a plurality of LIDAR sensors operated in connection with a perception system of an autonomous vehicle. In some instances, the operation 102 may include combining or fusing data from two or more LIDAR sensors into a single LIDAR dataset (also referred to as a "meta spin"). In some instances, the operation 102 may include extracting a portion of the LIDAR data for processing, such as over a period of time. In some instances, the operation 102 may include receiving Radar data and associating the Radar data with the LIDAR data to generate a more detailed representation of an environment. An example of a LIDAR dataset is illustrated in an example 104, which may include LIDAR data (e.g., point clouds) associated with various objects in an urban environment, such as cars, trucks, roads, buildings, bikes, pedestrians, etc.

At operation 106, the process can include projecting the three-dimensional LIDAR data onto a projection shape. As illustrated in example 108, the operation 106 can include projecting the three-dimensional LIDAR data (also referred to generally as "LIDAR data") onto a spherical projection shape. In some instances, the operation 106 can include selecting a particular shape as the projection shape, and may include selecting a field of view, resolution, and/or projection type. As illustrated in the example 108, the spherical projection shape may include any number of cells 110. In some instances, the operation 106 can include virtually locating the projection shape around an origin of the three-dimensional LIDAR data, which in some cases, may correspond to a location of a LIDAR system, or may correspond to a virtual location of a LIDAR meta spin. That is, the operation 106 may include defining the projection shape, algorithmically locating the projection shape around the LIDAR data, and associating LIDAR points with a corresponding cell of the projection shape, such as the cell 110. In some instances, associating a LIDAR data point with a corresponding cell of the projection shape may include storing LIDAR data, such as (x, y, z) coordinates or polar coordinates of a point in a point cloud, in the corresponding cell. In some instances, the operation 106 may include storing range information (e.g., a distance from an origin of the vector to a point P of an object or a surface) in addition to (x, y, z) coordinates, and in some instances, the operation 106 may include storing a surface normal vector associated with each point P in the cell.

At operation 112, the process can include converting the projection shape into a multi-channel two-dimensional image. In an example 114, the projection shape is converted into a plurality of two-dimensional arrays 116, 118, 120, and 122. In some instances, the two-dimensional arrays 116, 118, 120, and 122 may be considered to be individual "images", with each image corresponding to an individual dimension of the LIDAR data stored in the cell 110 of the projection shape. For example, the two-dimensional array 116 may correspond to a range of each LIDAR data point associated with the projection shape, the two-dimensional array 118 may correspond to the x-coordinate of each LIDAR data point associated with the projection shape, the two-dimensional array 120 may correspond to the y-coordinate of each LIDAR data point associated with the projection shape, and the two-dimensional array 122 may correspond to the z-coordinate of each LIDAR data point associated with the projection shape. In some instances, each of the two-dimensional arrays 116, 118, 120, and 122 may be referred to as a channel, with the two-dimensional arrays 116, 118, 120, and 120 collectively referred to as a multi-channel two-dimensional image.

Of course, it may be understood that individual sets of multi-channel two-dimensional images may be generated at individual instants in time. That is, a first set of multi-channel two-dimensional images may be generated at a first time, while a second set of multi-channel two-dimensional images may be generated at a second time. Further, the operation 112 may include combining two or more sets of multi-channel two-dimensional images to create images with time as an additional channel.

At operation 124, the process may include performing segmentation and/or classification on the multi-channel two-dimensional image. An example 126 illustrates an output of one such segmentation operation, including segmentation information 128 associated with an object. In some instances, the segmentation information 128 may include a segmentation identification (ID) associated with each pixel or LIDAR data point, for example, with a particular segmentation ID defining a particular object. In some instances, the multi-channel two-dimensional images may be input to one or more machine learning networks, such as a convolutional neural network, to perform deep learning operations on the data to perform tasks such as segmentation and/or classification. In some instances, after segmentation information has been generated, the segmentation information can be applied to three-dimensional data to isolate or segment one or more objects for classification on a per object basis. Aspects of this additional object-based converting is described below with connection to FIG. 2, as well as other figures.

FIG. 2 illustrates a pictorial flow diagram of a process 200 for capturing three-dimensional data of an object, receiving segmentation information, adapting a rendering perspective for the object, converting the three-dimensional data of the object to two-dimensional data of the object, and performing classification. Aspects of the process 200 can be performed in addition to or in conjunction with the converting and segmenting operations described in connection with FIG. 1. In some instances, the classification operations performed in FIG. 2 may be selectively applied when a confidence level of a classification performed as described in FIG. 1 is below a confidence threshold, or in some instances, the operations in FIG. 2 can be performed in parallel to verify or confirm other classifications.

At operation 202, the process can include capturing three-dimensional data of an object. In some instances, the operation 202 can include capturing LIDAR data using one or more LIDAR sensor systems. In some instances, the operation 202 can include capturing a meta spin of LIDAR data, which may include combining or synthesizing LIDAR data from a plurality of LIDAR sensors or other sensors. For example, all points returned from multiple LIDAR systems may be transformed to a common coordinate system (e.g., a world coordinate system or a coordinate system relative to all LIDAR systems). As illustrated in example 204, the operation 202 can include capturing three-dimensional data of an object 206 using a LIDAR sensor 208 associated with a perception system of an autonomous vehicle 210. As illustrated, the capturing of LIDAR data is represented by the vectors 212 emanating from the LIDAR sensor 208. Further, the vectors 212 may represent a field of view of the LIDAR sensor 208, or a first perspective or direction of capturing data. Additionally, the operation 202 may include simulating at least a portion of the three-dimensional data, or receiving three-dimensional data from a simulator. An example of three-dimensional data of an object is illustrated in FIG. 1 as the example 104.

At operation 214, the process can include receiving segmentation information associated with the three-dimensional data of the object. In some instances, the segmentation information can be generated according to the process 100 illustrated in FIG. 1. In some instances, the segmentation information generated in the process 100 may include segmentation information associated with the two-dimensional representation of the three-dimensional data, in which case, the two-dimensional segmentation information may be converted to three-dimensional segmentation information. In some instances, the segmentation information may include a segmentation identification (ID) associated with each of the three-dimensional data points, which may be used in turn to determine which data points are to be associated with a particular object for segmentation. In some instances, the operation 214 may include receiving two-dimensional segmentation information and adding depth information to the segmentation information to capture depth information of the three-dimensional data. An example 216 illustrates segmentation information 218 applied to the three-dimensional data 220 corresponding to the object 206. As illustrated, the three-dimensional data 220 includes a point cloud, cluster, or blob of information associated with LIDAR data of the object 206. In some instances, the operation 214 can include extracting or segmenting the three-dimensional data 220 from a larger dataset to identify or isolate the data associated with the object.

At operation 222, the process can include adapting a rendering perspective for the object. As illustrated in example 224, a rendering plane 226 is positioned with respect to the segmented data 220 to maximize an extent of the segmented data 220 exposed to the rendering plane 226. As used herein, the rendering plane 226 may include a plane oriented relative to the segmented data 220 such that the segmented data 220 may be projected onto the rendering plane 226 to convert the three-dimensional data (e.g., the segmented data 220) into (multi-channel) two-dimensional data. For example, turning to the example 204, the autonomous vehicle 210 is located relative to the object 206 (illustrated as another car) such that the LIDAR sensor 208 essentially captures a front view of the object 206. Because the LIDAR sensor 208 may capture some depth aspects of the object 206 (e.g., illustrated as data corresponding to the rear tire or the rear bumper in the segmented data 220), the rendering plane 226 may represent a different perspective, as illustrated by the rendering perspective 228, such that when the segmented data 220 is projected onto the rendering plane 226, a horizontal extent and/or a vertical extent of projected data is maximized or optimized.

For example, the operation 222 may include determining a center of the segmented data 220, which may include determining a "center of mass" of the data points of the segmented data 220. Next, the operation 222 may include performing a principal component analysis of the segmented data to determine eigenvectors or principal components of the segmented data 220. In some instances, a first principal component may correspond to an axis of "maximum stretch" or variance of the segmented data 220. In some instances, the first principal component can be selected or determined as a principal component in the (x, y) plane (e.g., a horizontal plane). Next, a second principal axis can be selected as a principal component orthogonal to the first principal component in a vertical direction (e.g., the z-direction). In some instances, an initial rendering plane may be defined by the first principal component and the second principal component, and in some instances, the rendering plane (e.g., the rendering plane 226) may be determined by rotating the initial rendering plane about the first principal component, which conceptually can be considered as increasing a height of the rendering perspective 228. In some instances, the rendering plane 226 may be determined by rotating the initial rendering plane by a predetermined angle or number of degrees, or by selecting a predetermined height or a predetermined change in height for the rendering perspective 228, for example. Further, a center of the rendering plane 226 may be associated with a center of mass of the segmented data 220, for example, following a determination of the orientation of the rendering plane 226.

At operation 230, the process can include converting the three-dimensional data of the object to two-dimensional data of the object. As illustrated in example 232, the segmented data 220 may be converted to two-dimensional segmented data 234 represented on a rendering plane 236. As illustrated, the rendering plane 236 may represent a plan view of the rendering plane 226, while the rendering plane 226 may represent a perspective view of the rendering plane 226. In some instances, the three-dimensional segmented data 220 may be projected onto the rendering plane 236 to convert the three-dimensional segmented data 220 into the two-dimensional segmented data 234 illustrated in the example 232. Similar to the process 100, the two-dimensional segmented data 234 may include multiple channels, including range (e.g., indicating a distance between a point P of the three-dimensional segmented data 220 and the rendering perspective 228), (x, y, z) coordinates of the three-dimensional segmented data 220 that has been re-parameterized with respect to the rendering perspective 228, a surface normal vector associated with each point of the segmented data 220, time information, etc.

At operation 238, the process can include performing classification on the-two dimensional data of the object. In some instances, the operation 238 can include performing classification on the two-dimensional segmented data 234 that was projected onto the rendering plane 236 that was adapted or positioned according to the rendering perspective 228 to maximize or optimize a horizontal and/or vertical extent of the segmented data 220, as described herein.

Figure 3:
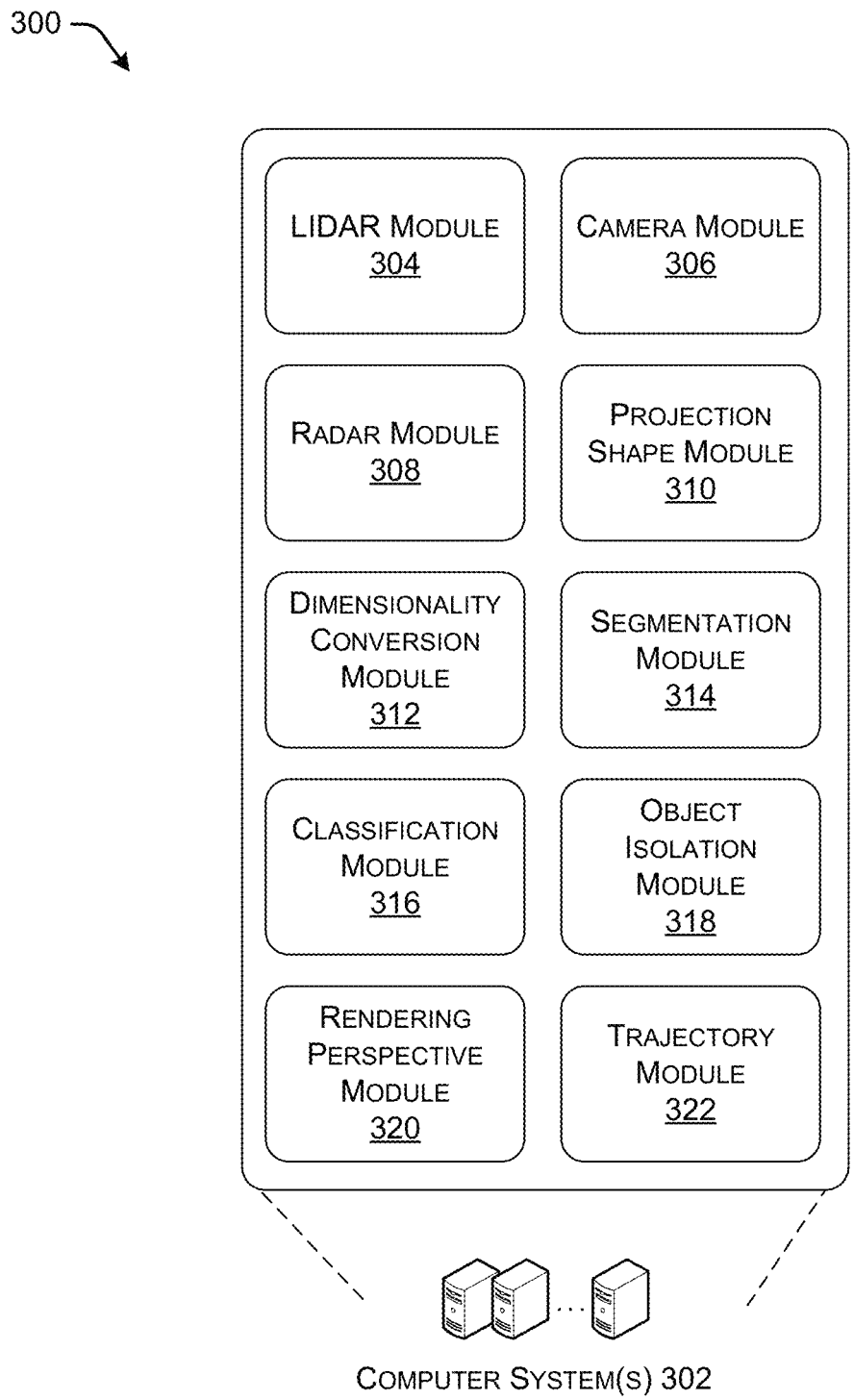
FIG. 3 illustrates an example architecture for implementing the data converting for image analysis, as described herein.

FIG. 3 illustrates an example architecture for implementing the data conversion for image analysis, as described herein. For example, the architecture 300 may include one or more computer system(s) 302 including various hardware and/or software to implement aspects of the systems, methods, and apparatuses described herein. For example, the computer system(s) 302 may include a LIDAR module 304, a camera module 306, a Radar module 308, a projection shape module 310, a dimension conversion module 312, a segmentation module 314, a classification module 316, an object isolation module 318, a rendering perspective module 320, and a trajectory module 322.

In some instances, the computer system(s) 302 may be embodied in an autonomous vehicle. In some instances, the computer system(s) 302 may provide perception and planning functionality for the autonomous vehicle. In general, the computer system(s) 302 may include LIDAR perception, Radar perception, Vision (camera) perception, segmentation and classification, tracking and fusion, and prediction/planning.

Turning to the LIDAR module 304, the LIDAR module 304 may include one or more LIDAR sensors to capture LIDAR data for image segmentation and classification, as described herein. In some instances, the LIDAR module 304 may include functionality to combine or synthesize LIDAR data from a plurality of LIDAR sensors to generate a meta spin of LIDAR data, which may refer to LIDAR data based on multiple LIDAR sensors. In the case of a meta spin of LIDAR data, the LIDAR module 304 may include functionality to determine a virtual origin of the meta spin data. In some instances, the LIDAR module 304 may include functionality to determine a range between a LIDAR sensor and a point P of an object or surface, and in some instances, the LIDAR module 304 may include functionality to determine a surface normal vector for each point P captured and/or sensed by the LIDAR module 304. As a non-limiting example, such a surface normal determination may be done by calculating the normal of the cross product of vectors indicating directions from the point, P, to two of P's nearest neighbors. As may understood in the context of this disclosure, the LIDAR module 304 may capture data and may transmit datasets to the computer system(s) 302 for subsequent processing.

The camera module 306 may include one or more camera sensors to capture vision data for image segmentation and/or classification. The camera module 306 may include any number and type of camera sensors. For example, the camera module 306 may include any color cameras, monochrome cameras, depth cameras, RGB-D cameras, stereo cameras, infrared (IR) cameras, ultraviolet (UV) camera, etc. As may understood in the context of this disclosure, the camera module 306 may capture data and may transmit datasets to the computer system(s) 302 for subsequent processing. For example, data from the camera module 306 may be included as one or more channels of a multi-channel image.

The Radar module 308 may include one or more Radar sensors to capture range, angle, and/or velocity of objects in an environment. As may understood in the context of this disclosure, the Radar module 308 may capture data and may transmit datasets to the computer system(s) 302 for subsequent processing. For example, data from the Radar module 308 may be included as one or more channels of a multi-channel image.

The computing system(s) 302 may include any number or type of other sensors suitable for use in an autonomous vehicle, for example. Various sensors may include, but are not limited to, sonar sensors, ultrasonic transducers, wheel encoders, microphones, inertial measurement unit(s) (IMU), accelerometers, gyroscopes, magnetometers, temperature sensors, humidity sensors, light sensors, global positioning system (GPS) sensors, etc.

In some instances, the LIDAR module 304, the camera module 306, and the Radar module 308 may provide one or more datasets to the computer system(s) 302 for combining and/or synthesizing the data for improved image segmentation and/or classification.

Further, the computer system(s) 302 may include functionality to receive and store sensor datasets as described herein. In some instances, the computer system(s) 302 may include functionality to annotate the stored data, which may include detecting, identifying, classifying, segmenting, labeling, etc. the data.

The computer system(s) 302 may further include simulated data that has been generated by a computer simulation algorithm, for use in part in testing. In some instances, the simulated data may include any type of simulated data, such as camera data, LIDAR data, Radar data, GPS data, etc. In some instances, computer system(s) 302 can modify, transform, and/or perform the converting operations described herein on the simulated data for verifying an operation and/or for training the machine learning algorithms, as described herein.

The projection shape module 310 may include functionality to determine a projection shape for use in data converting, as described herein. In some instances, the projection shape module 310 can determine a projection shape, a field of view, a resolution, and/or a projection type in converting three-dimensional data to multi-channel two-dimensional data. In some instances, the projection shape module 310 can select one or more characteristics of the projection shape to optimize performance of image segmentation and/or classification, to optimize a processing time, memory requirements, etc. Additional details of the projection shape that can be selected or modified by the projection shape module 310 are discussed below in connection with FIGS. 6A, 6B, 6C, and 6D.

The dimensionality conversion module 312 may include functionality to convert, transform, or map data having a first dimensionality to data having a second dimensionality. In some instances, the dimensionality conversion module 312 may convert one or more three-dimensional LIDAR datasets to one or more multi-channel two-dimensional images. For example, the dimensionality conversion module 312 may include virtually locating a projection shape around a portion of three-dimensional data, associating one or more data points with various cells of the projection shape, and unrolling, converting, or converting data from the projection shape to the one or more multi-channel two-dimensional images. The dimensionality conversion module 312 may perform any conversion operations to convert the three-dimensional data to two-dimensional data, including but not limited to spherical projections (e.g., stereographic and cylindrical), Mercator projection, direct polar conversion (e.g., spherical or equirectangular projection), etc. Additional aspects of the dimensionality conversion module 312 are provided throughout this disclosure.

The segmentation module 314 may include functionality to perform segmentation on one or more multi-channel two-dimensional images. For example, the segmentation module 314 may input the one or more multi-channel two-dimensional images to or more machine learning algorithms. For example, the segmentation module 314 (also referred to as a "segmenter") may perform image segmentation to segment objects represented in the data for subsequent image classification. In some instances, any hardware and/or software configured to perform segmentation operations on data may be considered to be a segmenter. In some instances, the segmentation module 314 may operate on any number of channels associated with the two-dimensional images. For example, the segmentation module 314 may receive one or more channels as inputs including, but not limited to, range channels, x-axis channels, y-axis channels, z-axis channels, surface normal vector channels, reflectivity channels, time channels, etc. In some instances, the segmentation module 314 may use any machine learning algorithm. In particular, the segmentation module 314 may utilize a convolutional neural network trained to segment multi-channel two-dimensional data representing LIDAR data, for example.

The classification module 316 may include functionality to receive segmented data and to identify a type of object represented by the data. For example, the classification module 316 may classify one or more objects, including but not limited to cars, buildings, pedestrians, bicycles, trees, free space, occupied space, street signs, lane markings, etc. In some instances, the classification module 316 may perform classification on data segmented using the operations described in the process 100, and/or may perform classification on data segmented using the operations described in the process 200. The classification module 316 and/or the segmentation module 314 may comprise any machine learning algorithms such as neural networks to perform operations of segmentation and classification.

As described herein, an exemplary neural network is a biologically inspired algorithm which passes input data through a series of connected layers to produce an output. One example of a neural network may include a convolutional neural network, or CNN. Each layer in a CNN may also comprise another CNN, or may comprise any number of layers. Details are provided below in connection with FIG. 9. As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naive Bayes, multinomial naive Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

The object isolation module 318 may include functionality to receive segmentation data and apply the segmentation data to three-dimensional LIDAR data, for example, to isolate or extract LIDAR data for subsequent processing. For instance, the object isolation module 318 can isolate a segmented object for subsequent classification. In some instances, the object isolation module 318 can receive two-dimensional segmentation data and convert the two-dimensional segmentation data to three-dimensional segmentation data to isolate an object represented by three-dimensional data. In some instances, the object isolation module 318 may operate to isolate an object for classification on a per object basis (e.g., based on a segmentation identification (ID) associated with each data point).

The rendering perspective module 320 may include functionality to alter a perspective of a rendering plane to convert three-dimensional data of an object to two-dimensional data for subsequent classification. As illustrated in FIG. 2, for example, the rendering perspective module 320 may determine a virtual LIDAR perspective such that, when projecting three-dimensional data onto a rendering plane, a horizontal extent of the data and/or a vertical extent of the data is maximized or optimized. In some instances, the rendering perspective module can determine a height and range of the virtual LIDAR sensor from the rendering plane. In some instances, the size and/or location of the rendering perspective and/or the rendering plane may depend on a size of image to be input to a classifier. For example, if a classifier receives as input images with a size of 32 pixels by 32 pixels, the rendering perspective module 320 may alter a perspective of the virtual LIDAR sensor to capture a width of a segmented object with the pixel constraint defined by the classification input image size. Additional details of the rendering perspective module 320 are provided in connection with FIGS. 2 and 10, as well as throughout this disclosure.

The trajectory module 322 may include functionality to receive segmented and/or classified data to determine a trajectory of an autonomous vehicle to operate is a safe manner. For example, the trajectory module 322 may receive image segmentation and/or classification information identifying free space on a road for an autonomous vehicle to travel, and generate a trajectory for the autonomous vehicle to follow. In some instances, the trajectory module 322 may receive as inputs the segmented and/or classified objects as discussed herein and may track objects to generate a trajectory based at least in part on such objects.

Additional details of the computer system(s) 302 are provided below in connection with FIG. 14.

Figure 4A:
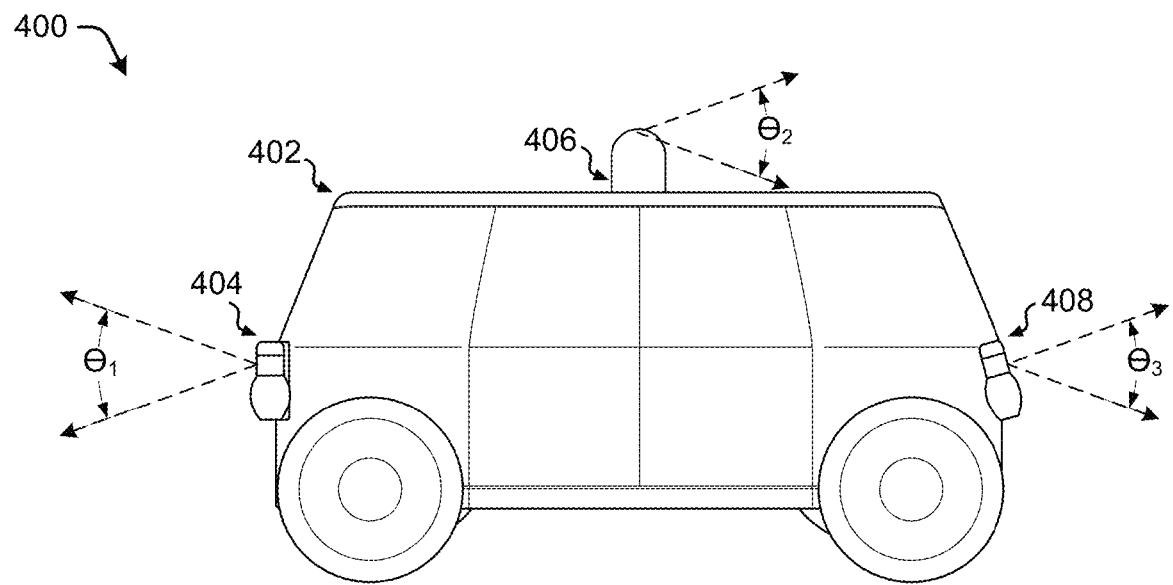
FIG. 4A depicts a side view of an example vehicle having multiple sensor assemblies mounted to the vehicle.

FIG. 4A depicts a side view 400 of an example vehicle 402 having multiple sensor assemblies mounted to the vehicle 402. In some instances, datasets from the multiple sensor assemblies can be combined or synthesized to form a meta spin (e.g., LIDAR data representing a plurality of LIDAR sensors) or can be combined or fused using sensor fusion techniques to improve an accuracy or processing for segmentation, classification, prediction, planning, trajectory generation, etc.

As shown in the side view 400, the vehicle 402 may include any number of sensors in any combination or configuration. For example, the vehicle 402 includes at least sensors 404, 406, and 408. In some instances, the sensor 404 may comprise a Radar sensor having a vertical field of view illustrated as $\ominus_1$. The sensor 406 may include a LIDAR sensor mounted on a roof of the vehicle 402, the sensor 406 having a vertical field of view illustrated as $\ominus_2$. In some instances, the sensor 408 may include a camera sensor having a vertical field of view $\ominus_3$. Of course, the vehicle 402 may include any number and type of sensors, and is not limited to the examples provided in connection with FIG. 4A.

Figure 4B:
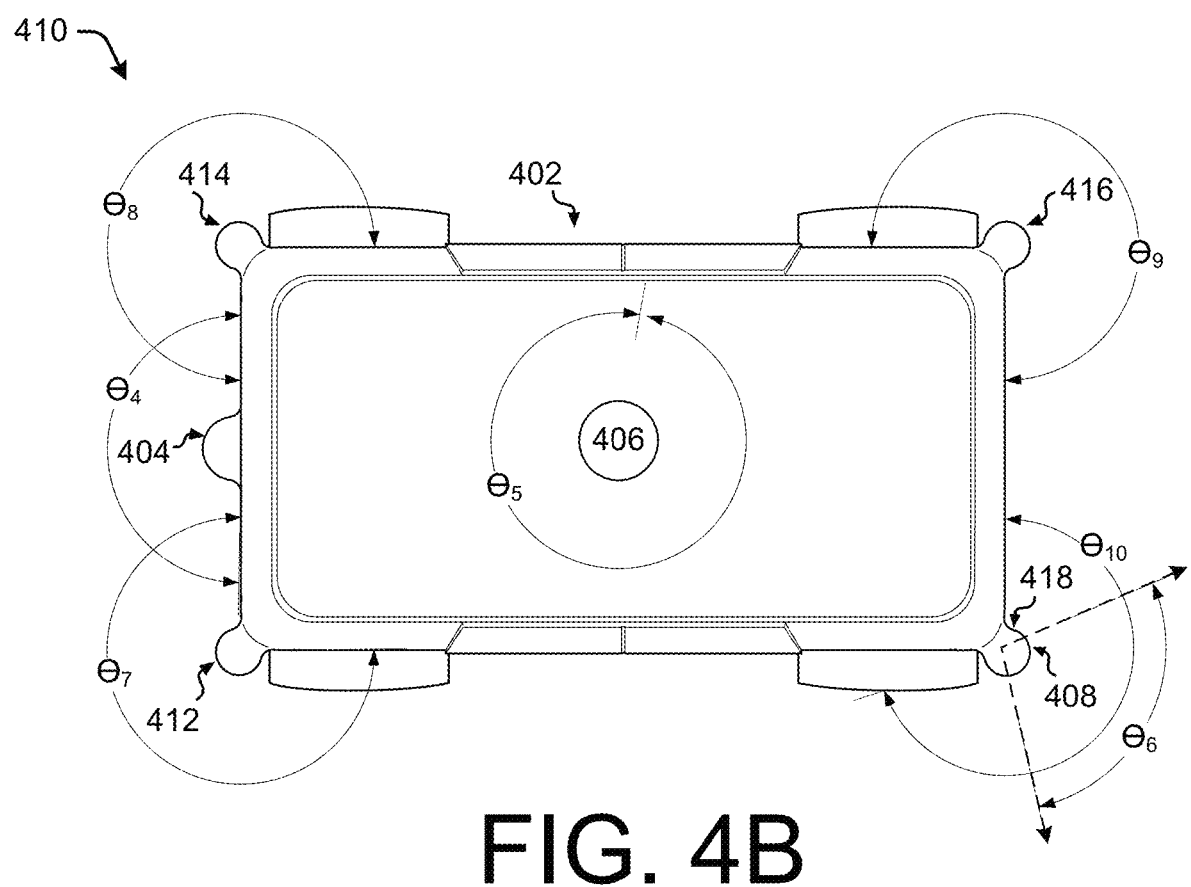
FIG. 4B depicts a top plane view of an example vehicle having multiple sensor assemblies mounted to the vehicle.

FIG. 4B depicts a top plane view 410 of the example vehicle 402 having multiple sensor assemblies mounted to the vehicle. For example, the sensors 404, 406, and 408 can be seen in FIG. 4B, as well as additional sensors 412, 414, 416, and 418. For example, the sensors 408 and 418 may be co-located or located proximate to one another, but may include different sensor types or modalities, having various fields of view. In some instances, the sensors 412, 414, 416, and 418 may include additional LIDAR, Radar, and/or camera sensors. As may be understood in the context of this disclosure, the vehicle 402 may include any number and any type of sensors. As illustrated in FIG. 4B, the sensor 404 may include a horizontal field of view $\ominus_4$, the sensor 406 may include a horizontal field of view $\ominus_5$, the sensor 408 may include a horizontal field of view $\ominus_6$, the sensor 412 may include a horizontal field of view $\ominus_7$, the sensor 414 may include a horizontal field of view $\ominus_8$, the sensor 416 may include a horizontal field of view $\ominus_9$, and the sensor 418 may include a horizontal field of view $\ominus_{10}$. As may be understood in the context of this disclosure, the mounting locations and fields of view may include any number of configurations.

FIGS. 1, 2, 5A, 5B, 8, and 11-13 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5A:
FIGS. 5A and 5B illustrate a pictorial flow diagram of an example process for converting multi-dimensional data for image analysis.
Figure 5B:
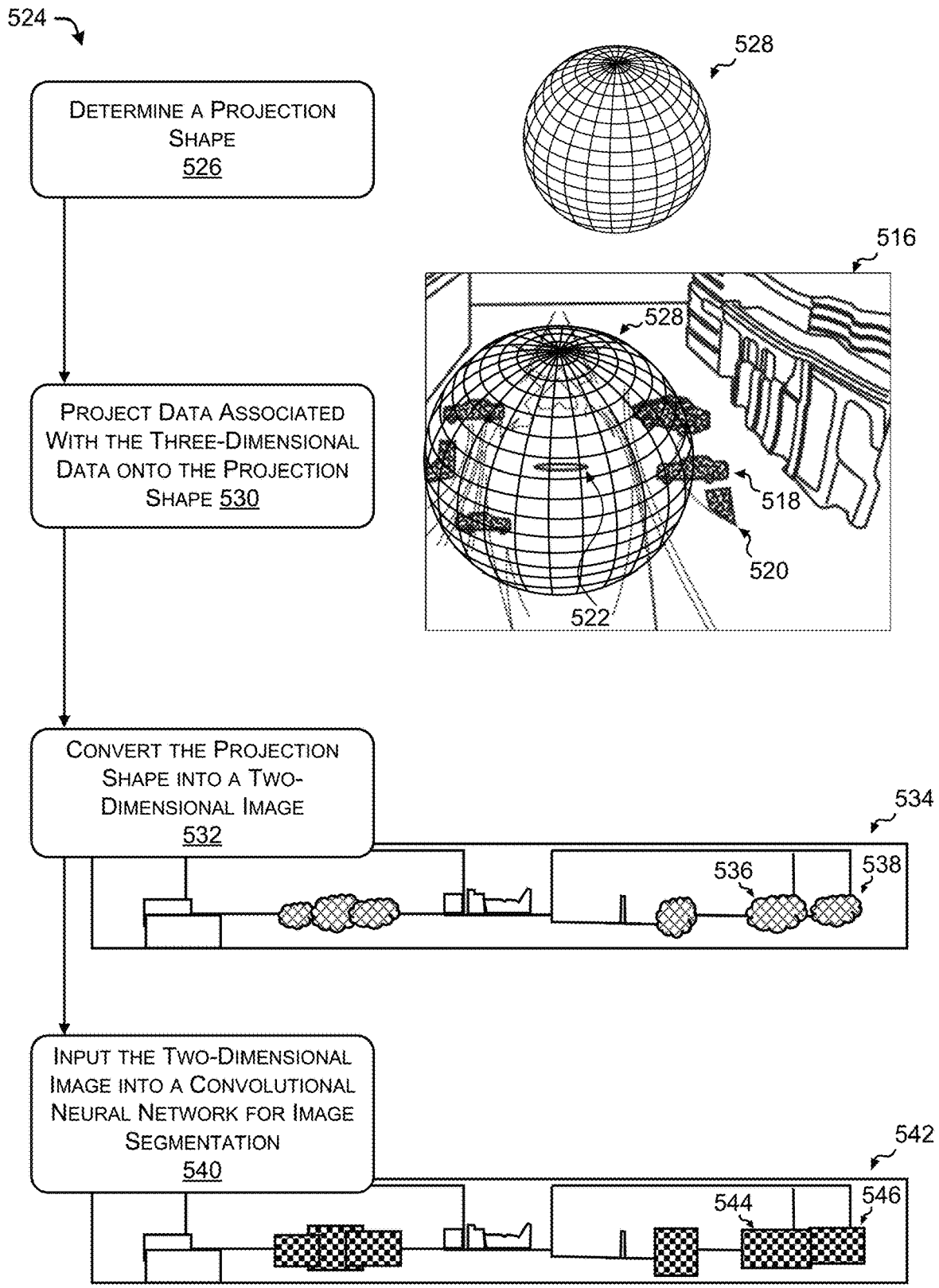

FIGS. 5A and 5B illustrate a pictorial flow diagram of a process 500 for converting multi-dimensional data for image analysis. For example, some or all of the process 500 can be performed by one or more components in the architecture 300, or in the environment 1400, as described below.

At operation 502, the process may include receiving three-dimensional data. In some instances, the three-dimensional data may include LIDAR data from one or more sensors. In some instances, the three-dimensional data may include fused sensor data including LIDAR data and Radar data. In some instances, the data received in the operation 502 is not limited to three dimensions, and may include any number of dimensions. A representation of three-dimensional data is illustrated as an example 504, which represents a point cloud of LIDAR data in an urban environment, including one or more cars 506 and 508, buildings 510, etc.

At operation 512, the process may include extracting at least a portion of the three-dimensional data. For example, as illustrated in the example 504, a segment 514 may represent a path or trajectory of an autonomous vehicle taken over a period of time, the period of time corresponding to a time associated with the portion of the three-dimensional data extracted in the operation 512. That is, the segment 514 represents a period of time, and an example 516 may correspond to the three-dimensional data over that period of time. As illustrated, the example 516 may include three-dimensional data 518 and 520 (e.g., point clouds), which may correspond to the cars 506 and 508 illustrated in the example 504. In some instances, an origin of the three-dimensional data (e.g., the one or more LIDAR sensors) may be represented as an origin 522. For example, the origin 522 may correspond to an origin of the vehicle, may correspond to a location of a single sensor, or may correspond to a "center of mass" of all the contributing sensors (e.g., in the context of a meta spin, as discussed above).

Turning to FIG. 5B, the process 500 continues with the flow diagram 524.

At operation 526, the process may include determining a projection shape. As illustrated, a projection shape 528 may include a spherical projection shape having a field of view, a resolution, and an associated projection type. Additional details of the projection shape 528 and determining the projection shape (e.g., in the operation 526) are provided with respect to FIGS. 6A, 6B, 6C, and 6D.

At operation 530, the process may include projecting data associated with the three-dimensional data onto the projection shape. In some instances, the operation 530 may include projecting a portion of the three-dimensional data (e.g., extracted in the operation 512) onto the projection shape. As illustrated in the example 516, the projection shape 528 is virtually located around the origin 522 of the three-dimensional data. Further, the operation 530 may include mapping data associated with the three-dimensional data to individual cells of the projection shape. Additional details of mapping data onto the projection shape are provided with respect to FIGS. 7A and 7B.

At operation 532, the process may include converting the projection shape into a two-dimensional image. For example, the operation 532 may use any conversion techniques, including but not limited to spherical projections (e.g., stereographic and cylindrical), Mercator projection, direct polar conversion (e.g., spherical or equirectangular projection), etc. As illustrated in example 534, the projection shape 528 has been converted to the two-dimensional image, with various point clusters 536 and 538 representing three-dimensional data converted to two-dimensional data. In some instances, the point clusters 536 and 538 may correspond to the three-dimensional data 518 and 520, respectively.

At operation 540, the process may include inputting the two-dimensional (multi-channel) image into a convolutional neural network for image segmentation. An example 542 illustrates an output of the operation 540, illustrating segmentation information 544 and 546. In some cases, the segmentation information 544 and 546 may correspond to the point clouds 536 and 538 of the example 534, respectively. In some instances, any suitable machine learning algorithm may be used for segmentation. Further, the operation 540 may include inputting the segmentation information and/or the two-dimensional (multi-channel) image into a convolutional neural network (or any machine learning algorithm) for classification. In some instances, the operation 540 may include providing the segmentation information 544 and 546 to another classification operation that may adapt a rendering perspective on a per object basis, as discussed herein. In some instances, the operation 540 may selectively invoke the segmentation and classification on a per-object basis, or may perform classification on the two-dimensional image, as described herein.

Figure 6A:
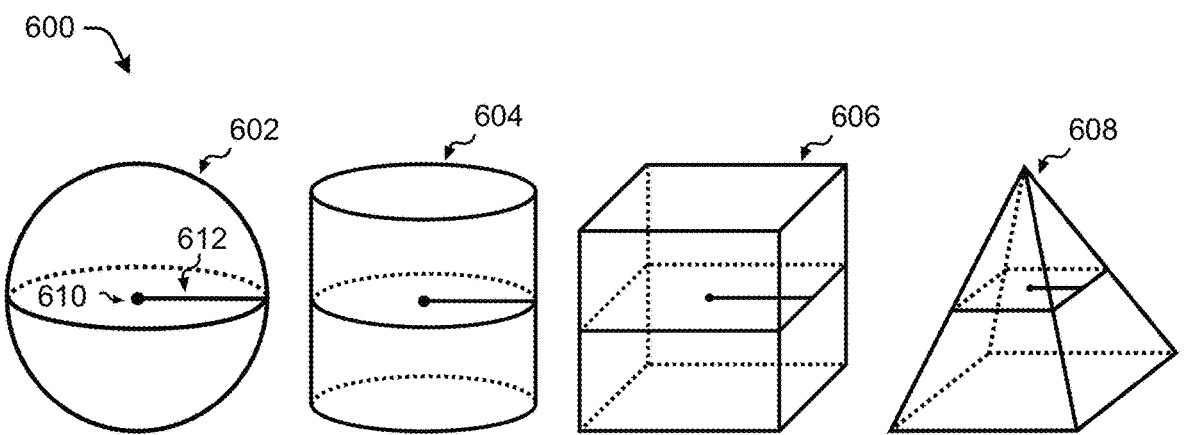
FIG. 6A illustrates various examples of projection shapes for use in converting multi-dimensional data for image analysis.

FIG. 6A illustrates various examples 600 of projection shapes for use in converting multi-dimensional data for image analysis. Exemplary projection shapes include a spherical projection shape 602, a cylindrical projection shape 604, a cubic or rectangular projection shape 606, a pyramidal projection shape 608, etc. It may be understood that any shape may be used as a projection shape, and that the projection shapes are not limited to the examples described above. For example, a projection shape may include a shape that such as a sphere or triangle with a top and/or bottom cut off. Further associated with the spherical projection shape 602, the spherical projection shape 602 may include an associated origin point 610 and a radius 612 which define, in part, a location of the spherical projection shape 602 and a size of the spherical projection shape 602 when using the converting operations described herein. For example, the origin point 610 may be located proximate to the origin 522 of FIG. 5B when associating the spherical projection shape 602 with the three-dimensional data. In some instances, the origin point 610 may be collocated with the center of the sphere representing the spherical projection shape 602, although in other cases, the origin point 610 may be at any location within the interior of the spherical projection shape 602. As may be understood, the dimensions of a particular projection shape may depend on a variety of factors, and may be based in part on a type of projection shape. For example, an ellipsoid projection shape may have a major axis and a minor axis; the cylindrical projection shape 604 may have a height of the cylinder, a radius of the cylinder, and a height of the origin point, for example.

Figure 6B:
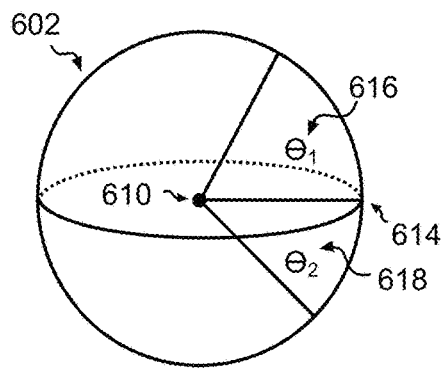
FIG. 6B illustrates an example of a field of view associated with a spherical projection shape for use in converting multi-dimensional data for image analysis.

FIG. 6B illustrates an example of a field of view associated with a spherical projection shape 602 for use in converting multi-dimensional data for image analysis. In some instances, a LIDAR sensor may be installed on a roof of a vehicle, such that when aligning or transforming the origin point 610 of the spherical projection shape 602 with the LIDAR sensor (e.g., the LIDAR sensor 406 of FIG. 4A), LIDAR sensor data may be available for spaces below a horizon point 614 and above the horizon point 614. Thus, the spherical projection shape 602 (and any projection shape) may have an associated upper field of view 616 above the horizon and a lower field of view 618 below the horizon. For example, the upper field of view 616 may be defined, in part, by an angle $\Theta_1$, while the lower field of view 618 may be defined, in part, by an angle $\Theta_2 2$. In some instances, data outside the field of view may be ignored, discarded, omitted, etc., for the purpose of mapping and/or converting data for image analysis. In some instances, a field of view may differ depending on a portion of the projection shape. For example, for a portion of the projection shape towards a front of a vehicle (e.g., in a direction of travel), the field of view may be larger than a field of view for a portion of the projection shape towards a back of a vehicle (e.g., a direction opposite the direction of travel). In some instances, restricting a field of view improves a functioning of a computer by reducing an amount of data for processing.

Figure 6C:
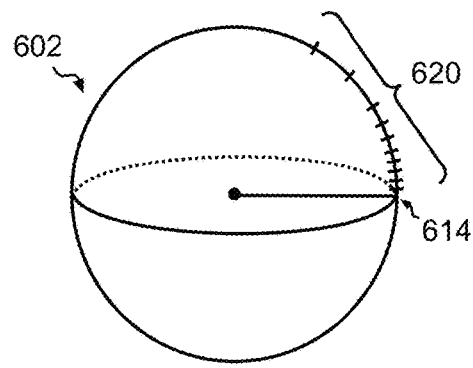
FIG. 6C illustrates an example resolution associated with a spherical projection shape for use in converting multi-dimensional data for image analysis.

FIG. 6C illustrates an example of a resolution associated with a spherical projection shape 602 for use in converting multi-dimensional data for image analysis. For example, the spherical projection shape 602 has an associated resolution 620 defining a size of cells of the projection shape (e.g., as illustrated by the example 108 and the cell 110). In some instances, an azimuthal (e.g., horizontal) resolution may be highest nearest a horizon, which in the context of an autonomous vehicle, may represent data closest to a street level. In some instances, an azimuthal resolution and an elevation (e.g., vertical) resolution may vary independently. In some instances, a resolution may be highest in a direction of travel of an autonomous vehicle. Although the resolution 620 is illustrated above the horizon point 614, it may be understood in the context of this disclosure that a resolution may vary for any direction, aspect, or dimension of the projection shape, for example. In some instances, a resolution may be highest near the horizon point 614, and may gradually decrease moving away from the horizon point 614, as illustrated. In some instances, a resolution may be fixed or constant for some or all portions of the projection shape. Additional aspects of the resolution may be understood in connection with the various figures of this disclosure.

Figure 6D:
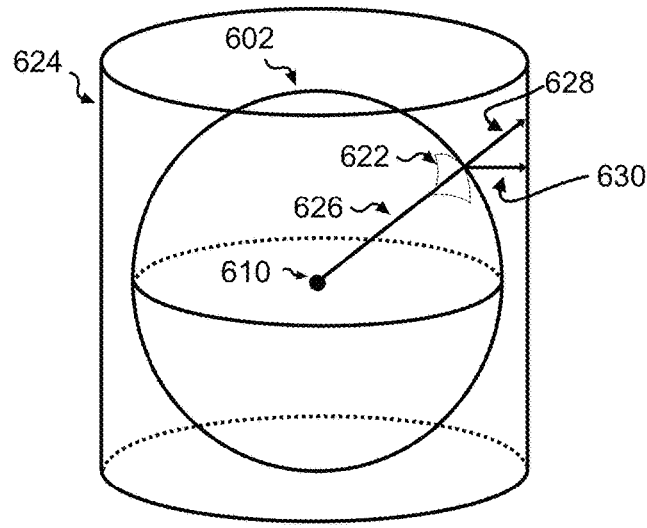
FIG. 6D illustrates an example of projection types for use in converting multi-dimensional data for image analysis.

FIG. 6D illustrates an example of projection types for use in converting multi-dimensional data for image analysis. In some instances, a cell 622 of the spherical projection shape may be associated with three dimensional information, as described herein. In converting the projection shape to a two-dimensional surface, a number of projection techniques may be used. For example, using a cylindrical projection technique, a cylinder 624 can be envisioned as surrounding the spherical projection shape 602. In projecting the data associated with the cell 622 to the cylinder 624, perspective geometry or orthogonal geometry may be used. For example, in the case of perspective geometry, data associated with the cell 622 can be projected onto the cylinder 624 by extending a vector 626 from the origin point to the cell 622 as a projection vector 628. In a case of orthogonal geometry, an orthogonal vector 630 can extend from the cell 622 to the cylinder 624 to map the data in the cell 622 to the cylinder 624. As may be understood, any number of projection techniques may be used to convert data associated with a particular projection shape to a two-dimensional image.

Figure 7A:
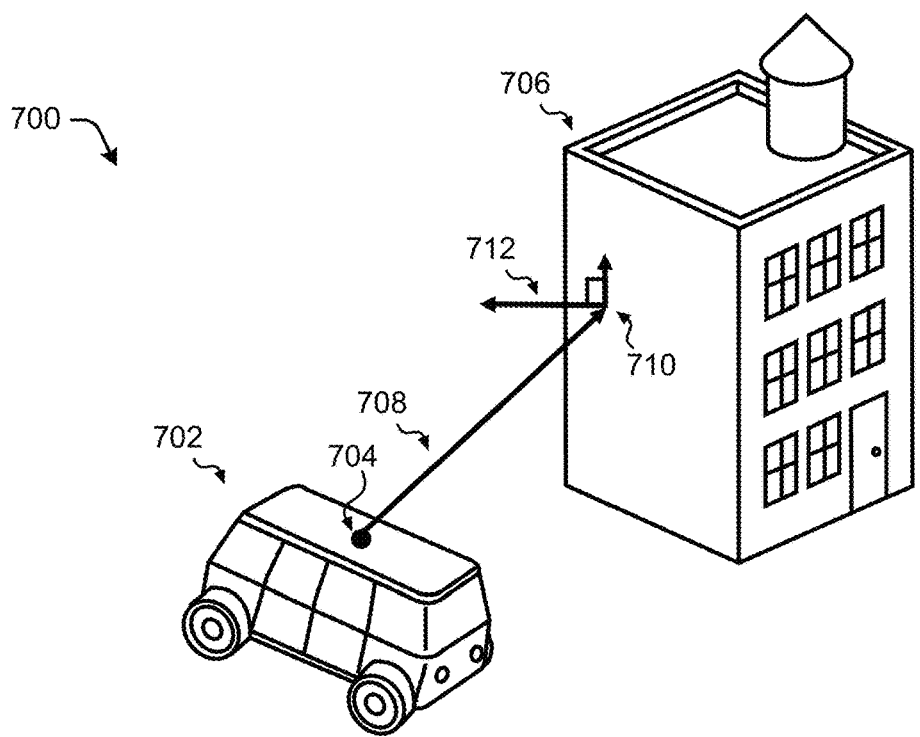
FIGS. 7A and 7B illustrate an example of using a projection shape to map data associated with a vector to a projection area for use in converting multi-dimensional data for image analysis.
Figure 7B:
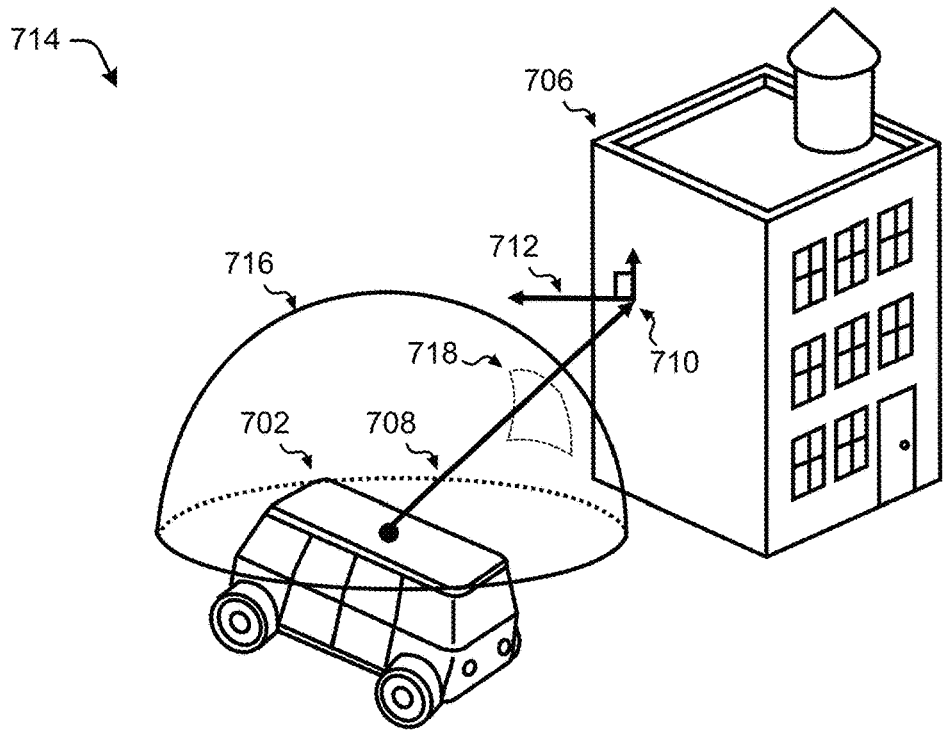

FIGS. 7A and 7B illustrate an example of using a projection shape to map data associated with a vector to a projection area for use in converting multi-dimensional data for image analysis.

FIG. 7A illustrates an example 700 of an autonomous vehicle 702 using a LIDAR sensor 704 to capture LIDAR associated with one or more measurements of a building 706. For example, a vector 708 from the LIDAR sensor 704 to a point P 710 is captured as a measurement associated with the building 706. In some instances, the vector 708 may be associated with (x, y, z) coordinate information, a time of the measurement, a location of the autonomous vehicle 702, a distance of the vector 708 (e.g., a range), a surface normal vector 712 associated with point P 710, etc. As may be understood, the LIDAR sensor 704 may be capturing thousands or millions of points per second, at varying resolutions, frame rates, etc. In some instances, the operations illustrated in the example 700 may correspond to an operation of capturing three-dimensional LIDAR data.

FIG. 7B illustrates an example 714 of determining a projection shape and projecting the three-dimensional data onto the projection shape. The example 714 illustrates a partial spherical projection shape 716 having at least one cell 718 through which the vector 708 passes. As described above, the vector 708 may be associated with captured data such as (x, y, z) coordinates of the point P 710 on the building 706. Further, the vector 708 maybe associated with the surface normal vector 712 associated with the point P 710. The information associated with the vector 708 may be stored in the cell 718 and further processed for converting, as described herein.

Figure 8:
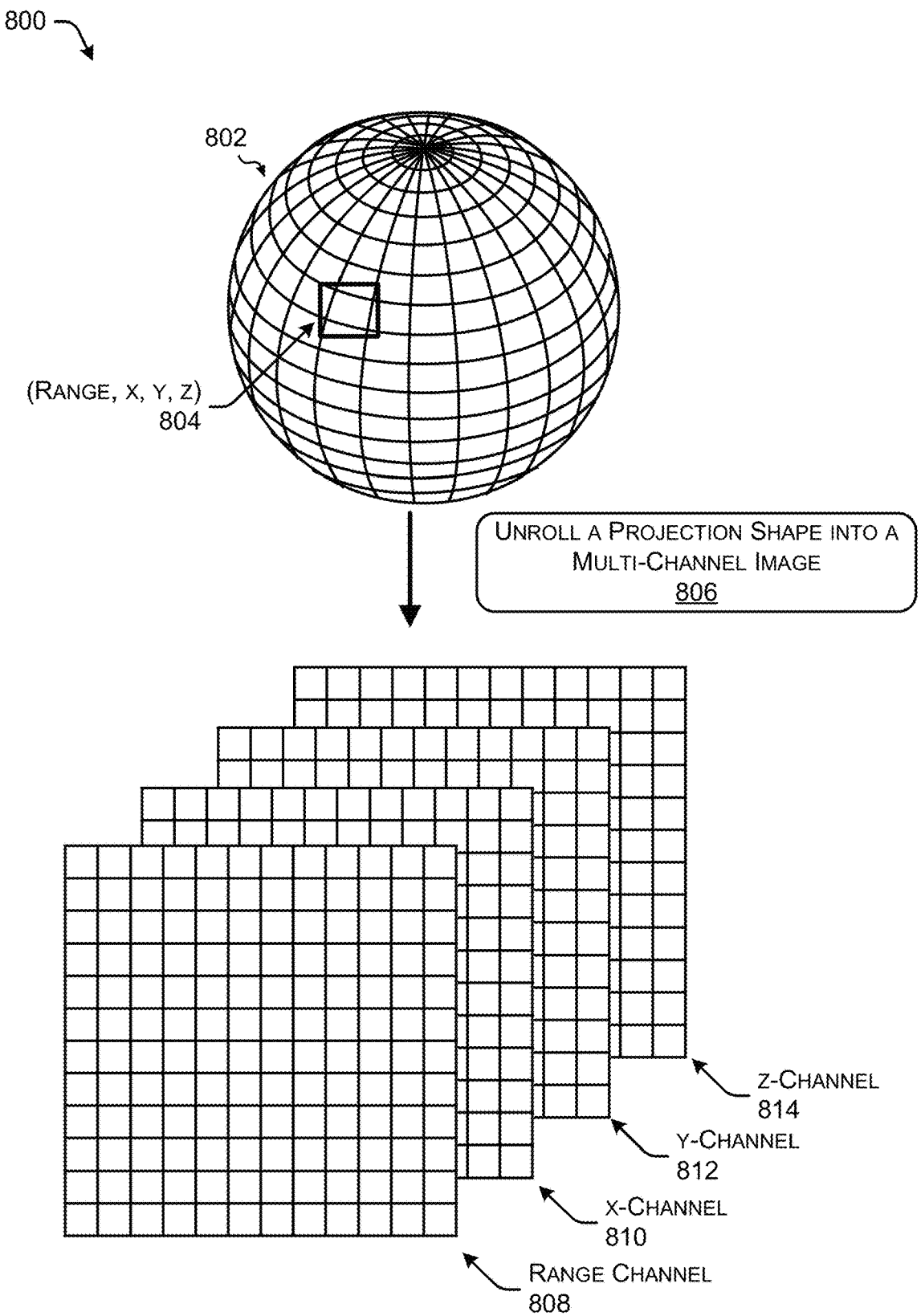
FIG. 8 is an example of unrolling a projection shape into a multi-channel image.

FIG. 8 is an example 800 of a process for unrolling a projection shape into a multi-channel image. The example 800 illustrates a spherical projection shape 802 including a cell 804 with three-dimensional data including range and (x, y, z) coordinates. As may be understood, the spherical projection shape 802 may include any number of cells representing LIDAR data projected onto the projection shape, as described herein.

At operation 806, the process includes unrolling a projection shape into a multi-channel image. For example, as discussed with respect to the spherical projection shape 802, each cell of the spherical projection shape 802 may be associated with LIDAR data. In some instances, various elements of data may be associated with an individual channel, such that each channel of data may be unrolled into a separate channel. For example, range data of the spherical projection shape may be stored in a range channel 808. Similarly, the (x, y, z) coordinate data may be stored in a respective one of an x-channel 810, a y-channel 812, and a z-channel 814. As may be understood, a multi-channel image may include any number of channels and is not limited to the examples given in FIG. 8. For example, a channel may include information associated with surface normal vectors of captured points. By way of another example, a channel may include information associated with a camera sensor, Radar data, GPS data, time of day, segmentation ID, etc.

Figure 9:
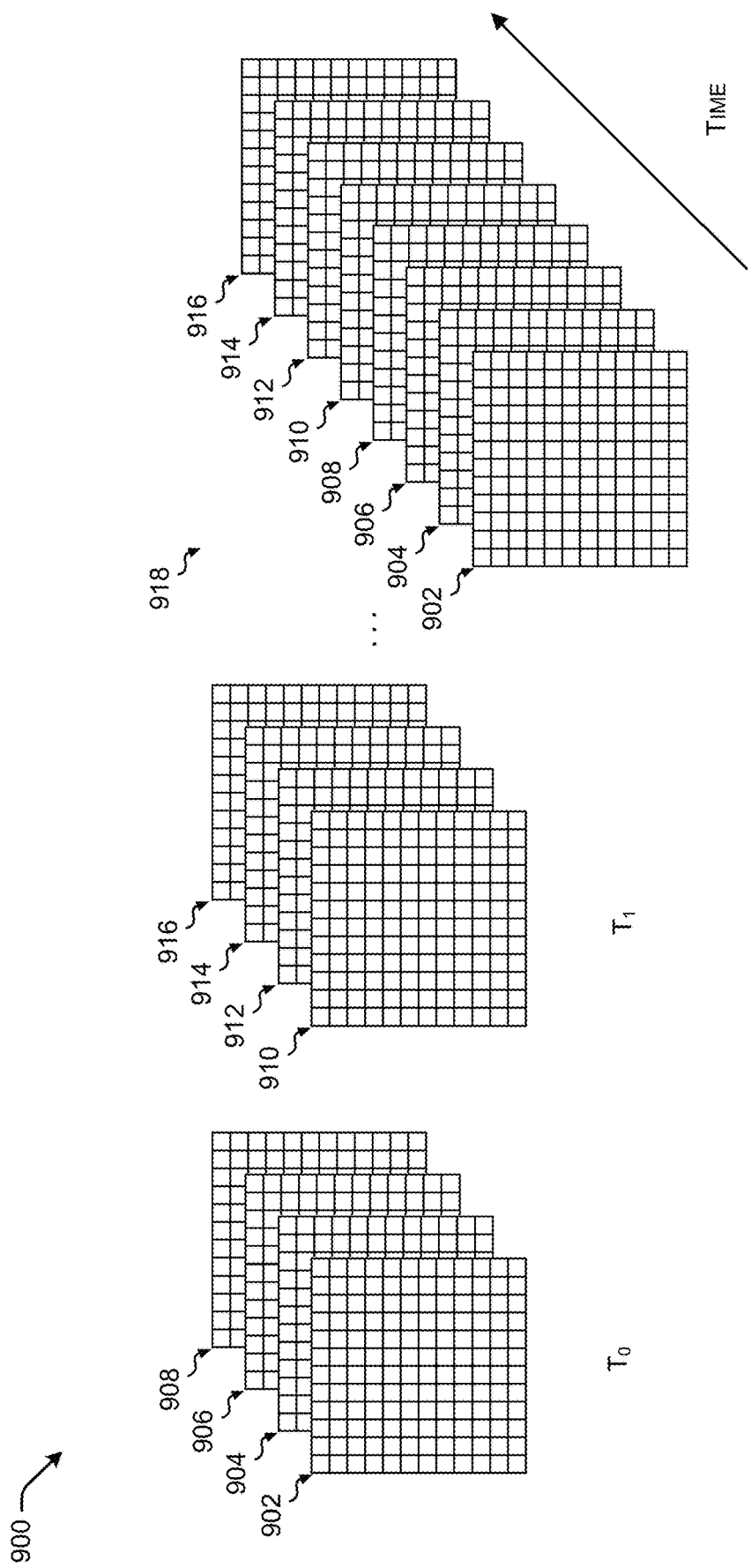
FIG. 9 is an example of combining data over time for incorporating temporal features into multi-channel data for image analysis.

FIG. 9 is an example 900 of combining data over time for incorporating temporal features into multi-channel data for image analysis. For example, as described above, three-dimensional data can be projected onto a projection shape and unrolled into a multi-channel image, comprised of individual channels 902, 904, 906, and 908. In some instances, the channels 902, 904, 906, and 908 may correspond to the channels 808, 810, 812, and 814, respectively, at a time $T_0$. That is, the channels 902, 904, 906, and 908 may represent two-dimensional data of an instant of time represented as $T_0$. Similarly, at a time $T_1$, which is a time different than $T_0$, three-dimensional LIDAR data may be mapped to individual channels 910, 912, 914, and 916. As may be understood in the context of this disclosure, the channels associated with time $T_0$ may be input to a convolutional neural network for segmentation and/or classification, while the channels associated with time $T_1$ may be separately input to the convolutional neural network for subsequent segmentation and/or classification. However, in some instances, as illustrated in example 918, data over various time periods may be stacked or combined as multi-channel data and input to a convolutional neural network for image segmentation and/or classification. In this manner, temporal information may be incorporated into segmentation and/or classification.

As may be understood, data reflecting any amount of time may be utilized in segmentation and/or classification. In some instances, data may be grouped according to a sliding time window for input to a convolutional neural network. For example, at a first time, multi-channel data representing times $T_0$, $T_1$, and $T_2$ may be input to a convolutional neural network. Subsequently, at a second time, multi-channel data representing times $T_1$, $T_2$, and $T_3$ may be input. At a third time, data representing $T_2$, $T_3$, and $T_4$ may be input, and so on. In some instances, a window may hop (e.g., include non-overlapping periods of time) instead of slide (e.g., include overlapping periods of time).

Figure 10A:
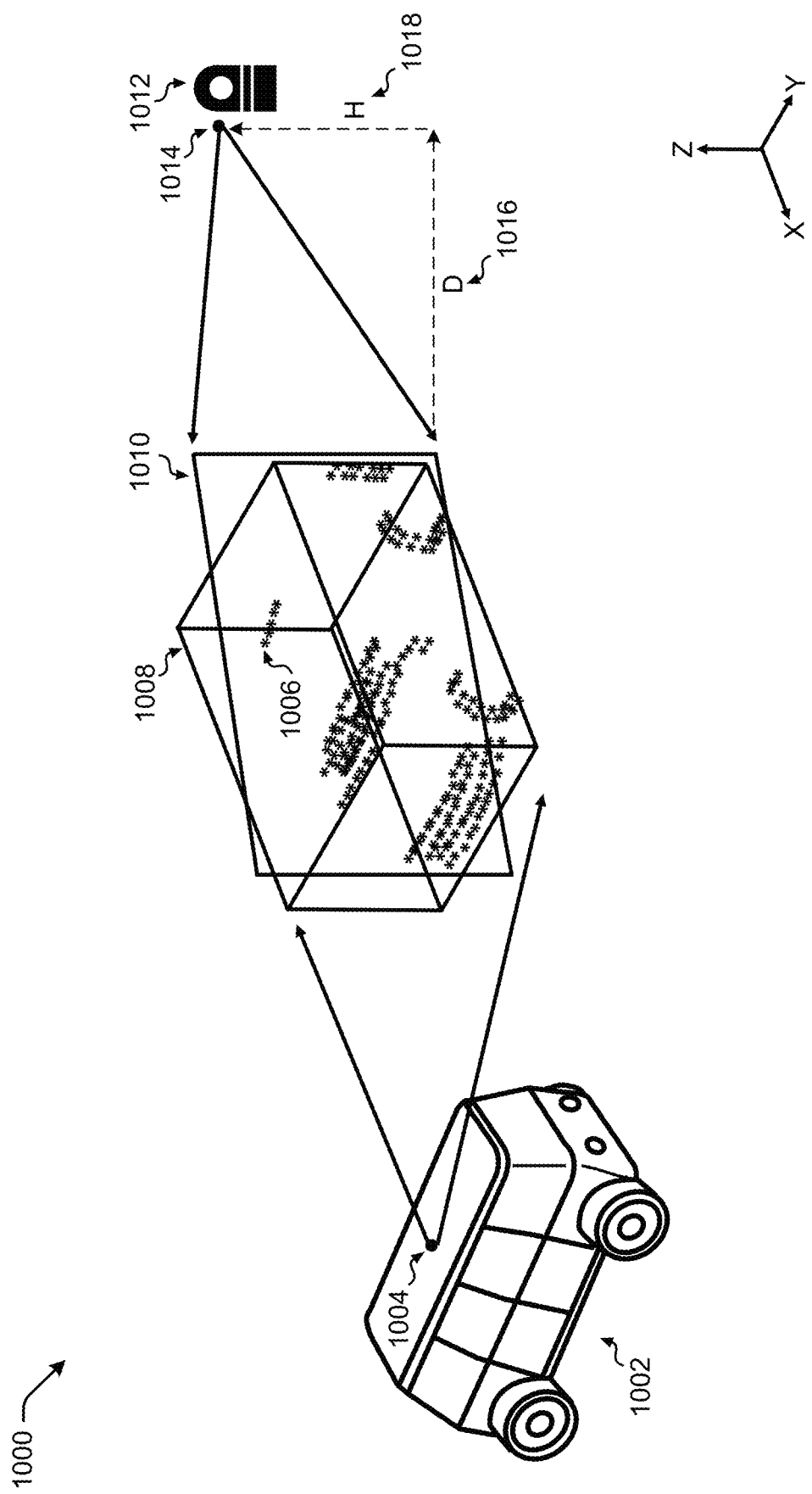
FIG. 10A is a graphical representation of an example of altering a viewpoint for rendering three-dimensional segmented data for subsequent image classification.

FIG. 10A is a graphical representation 1000 of altering a viewpoint for rendering three dimensional segmented data for subsequent image classification. As may be understood, aspects of FIG. 10A may be explained with reference to FIG. 2 and other figures. In some instances, FIG. 10A is a detail of the examples 216 and 224.

For example, FIG. 10A illustrates an autonomous vehicle 1002 including a LIDAR sensor 1004 for capturing three-dimensional LIDAR data 1006. As discussed in this disclosure, the three-dimensional LIDAR data 1006 may be captured by a perception system of the autonomous vehicle 1002 for generating a trajectory of the autonomous vehicle 1002. FIG. 10A illustrates a perspective view in an (x, y, z) coordinate system, although any coordinate system may be used.

As discussed above with respect to FIG. 1, the converting operations described herein may perform segmentation on three-dimensional LIDAR data to determine locations of objects. In some instances, segmentation data 1008 include two-dimensional segmentation data, three-dimensional segmentation data, segmentation identification (ID) that discretely associate data points with particular objects, etc. The segmentation data 1008 can be applied to the three-dimensional LIDAR data 1006 to identify and isolate data on a per object basis. For example, the LIDAR data 1006 may only include LIDAR data associated with a particular segmentation ID, or may include only the LIDAR data inside a three dimensional bounding box output from the segmentation algorithm. Having isolated (e.g., segmented) the three-dimensional LIDAR data 1006 using the segmentation data 1008, a rendering plane 1010 can be adapted to maximize or optimize an extent of a projection of the three-dimensional LIDAR data 1006 projected onto the rendering plane 1010.

In some instances, adapting the rendering plane 1010 may include positioning a rendering plane 1010 relative to the LIDAR data 1006 based at least in part on a principal component of the LIDAR data 1006 associated with the segmentation data 1008. As discussed above, an initial rendering plane can be define by a first principal component and a second principal component of the LIDAR data 1006. Further, the initial rendering plane can be "rotated" upwards (relative to the ground) by a predetermined angle or number of degrees. Conceptually, adapting the rendering plane 110 may include locating a virtual LIDAR sensor 1012 at a point 1014 that is a distance D 1016 from the rendering plane 1010 and a height H 1018 above a ground plane representing a lower edge of the rendering plane 1010. Further, the location of the point 1014 can be defined by the principal component analysis, as discussed herein.

In some instances, a size of the rendering plane 1010 may be based on an expected input size of a two-dimensional image to be input to a convolutional neural network for subsequent processing (e.g., classification). Thus, the distance D 1016 can be selected for each object such that the horizontal expanse of the three-dimensional LIDAR data 1006 is maximized or optimized when projected onto the rendering plane.

Further, the rendering plane 1010 may be characterized based on one or more angles of a surface normal vector of the rendering plane 1010 relative to the LIDAR sensor 1004. For example, for a particular vector emanating from the LIDAR sensor 1004 towards the three-dimensional LIDAR data 1006, the rendering plane 1010 may be oriented such that the surface normal vector of the rendering plane 1010 is offset in an x-direction and/or a y-direction. A direction of the surface normal vector of the rendering plane 1010 may be based at least in part on a principal component analysis of the LIDAR data 1006 to maximize or optimize on a per object basis a horizontal or vertical extent of the three-dimensional LIDAR data 1006 when projected onto the rendering plane 1010.

Figure 10B:
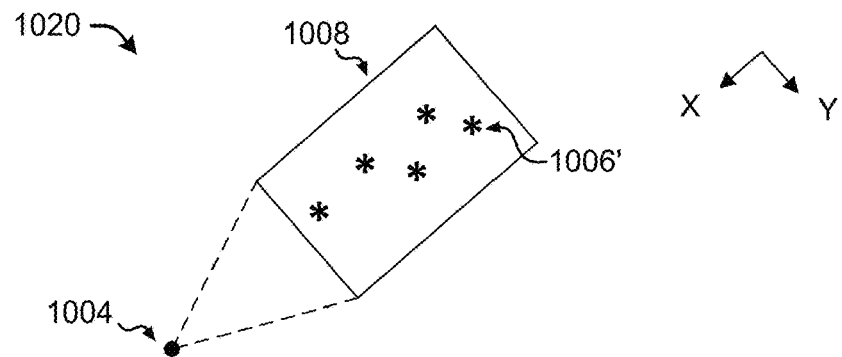
FIG. 10B is a plane view of a simplified representation of the graphical representation illustrated in FIG. 10A.

FIG. 10B is a plane view 1020 of a simplified representation of the graphical representation illustrated in FIG. 10A. As illustrated, FIG. 10B represents a two-dimensional view (e.g., viewing the (x, y) axes) of FIG. 10A. The simplified data 1006' represents simplified data compared to the LIDAR data 1006 illustrated in FIG. 10A.

Figure 10C:
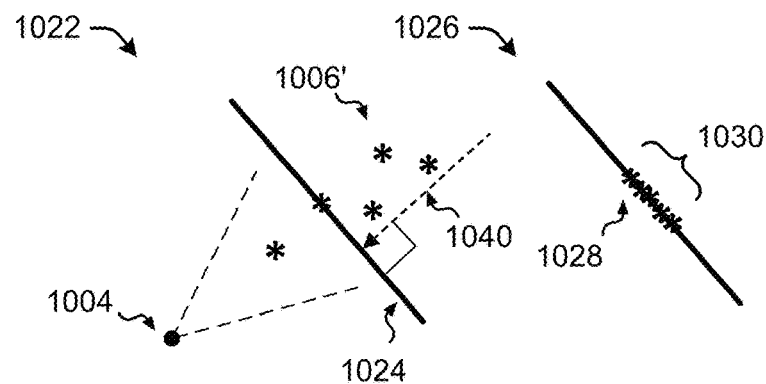
FIG. 10C is a plane view of an example of projecting three-dimensional segmented data onto a first plane.

FIG. 10C is a plane view 1022 of an example of projecting three-dimensional segmented data onto a first plane. In one example, a first plane 1024 represents a plane having a normal vector oriented in a direction of the LIDAR sensor 1004, which is to say a normal vector 1040 of the first plane 1024 points towards the LIDAR sensor 1004. The LIDAR data 1006' may be orthographically or geometrically projected onto the first plane 1024. For example, in an example 1026, the LIDAR data 1006' is projected onto the first plane 1024 such that the projected data 1028 has a horizontal extent 1030.

Figure 10D:
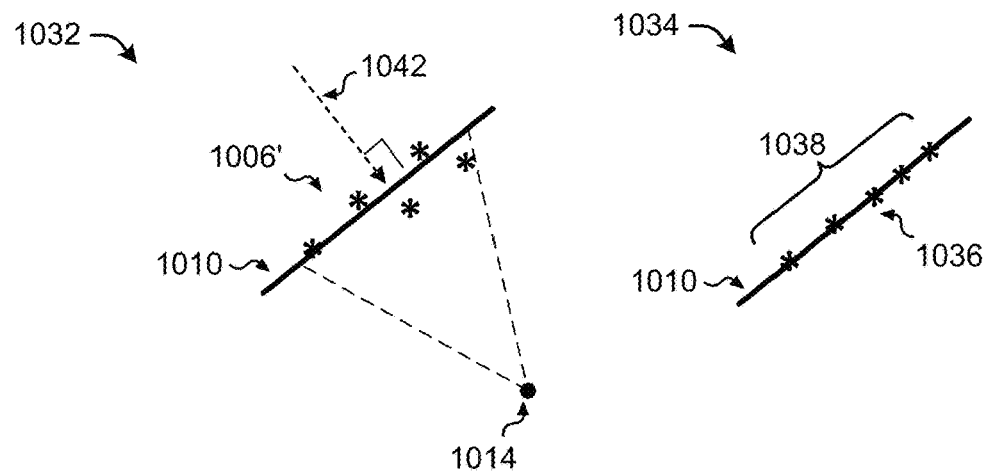
FIG. 10D is a plane view of an example of projecting three-dimensional segmented data onto a rendering plane.

FIG. 10D is a plane view 1032 of an example of projecting three-dimensional segmented data onto a rendering plane. For example, the rendering plane 1010 is illustrated as a plane with a normal vector 1042 in a direction of the point 1014. In 1034, the LIDAR data 1006' can be orthographically or geometrically projected onto the rendering plane 1010 such that the LIDAR data 1006' projected as projected data 1036 has a horizontal extent 1038. In some instances, the orientation of the rendering plane (e.g., determined by the point 1014) is based at least in part on a principal component analysis of the LIDAR data 1006' to maximize an extent of the horizontal extent 1038 (further subject to one or more rotations, as discussed herein). In some instances, the orientation can be selected to maximize a variance of the projected data 1036 in any direction.

In some instances, the LIDAR sensor 1004 represented in FIG. 10C may be considered to have or be oriented with respect to first perspective, and the point 1014 may be considered to have or be oriented with respect to a second perspective. Further, it may be understood in the context of this disclosure that a vertical extent may be maximized or optimized (e.g., with respect to an (x, z) or (y, z) representation of the data). In some instances, a first variance (e.g., associated with horizontal and/or vertical spread) of data can be determined with respect to data projected onto a plane associated with the first perspective and a second variance can be determined with respect to data projected onto the rendering plane associated with the second perspective. In some instances, the second perspective can be selected to substantially maximize the second variance. In some instances, a principal component analysis is performed on the segmented data to determine eigenvectors associated with the segmented data. In some instances, the principal component analysis can determine eigenvectors representing variance of the segmented data in each dimension.

Figure 11:
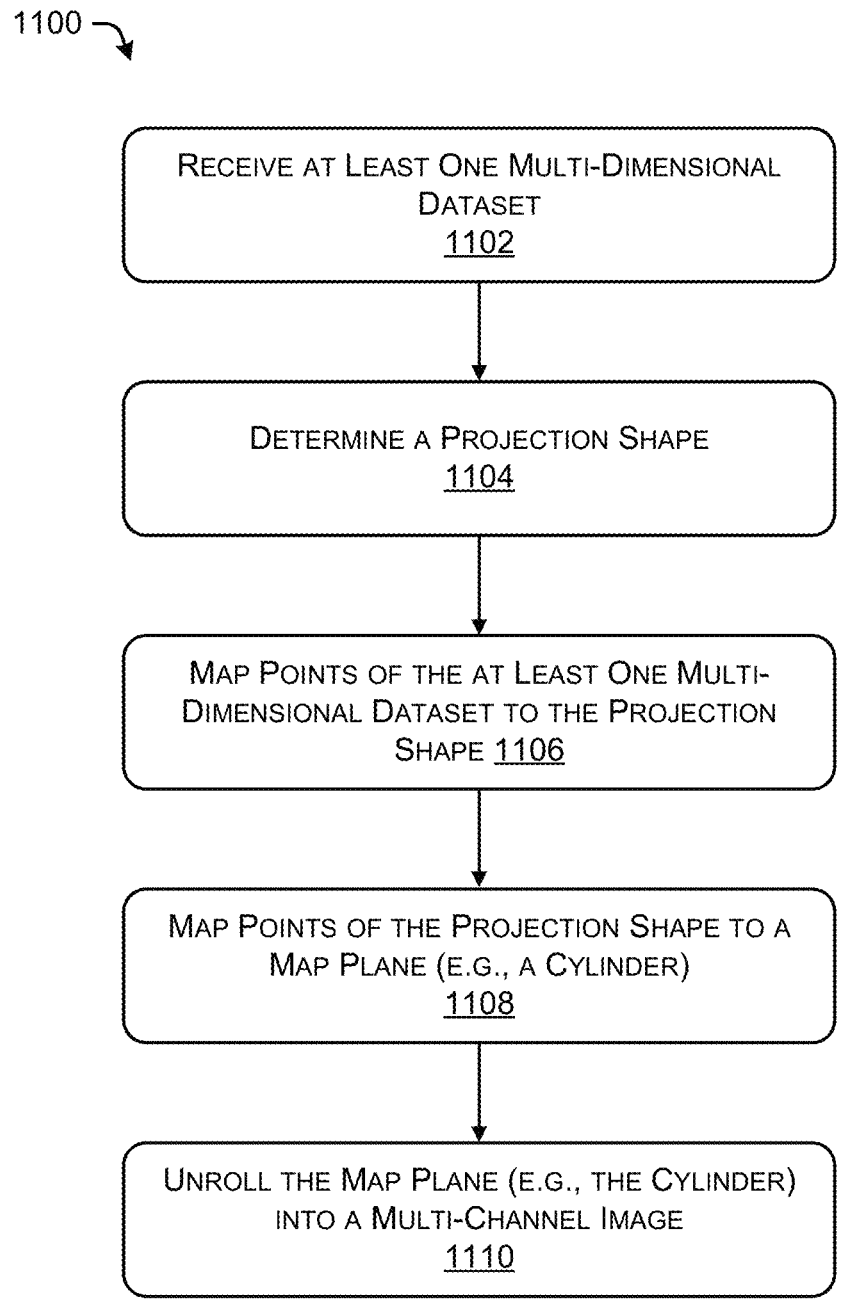
FIG. 11 depicts an example process for converting three-dimensional environment data to a multi-channel image.

FIG. 11 depicts an example process 1100 for converting three-dimensional environment data to a multi-channel image. For example, some or all of the process 1100 can be performed by one or more components in the architecture 300, or in the environment 1400, as described below.

At operation 1102, the process can include receiving at least one multi-dimensional dataset. In some instances, the three-dimensional dataset may include data from one LIDAR sensor or from many LIDAR sensors. In some instances, the at least one multi-dimensional dataset may represent real world data (e.g., captured by a sensor) or may represent data generated in a simulator. In some instances, the operation 1102 may include isolating or identifying an instant of time or a range of time of the data for processing.

At operation 1104, the process can include determining a projection shape. As discussed herein, determining a projection shape may include determining a particular shape, a field of view, a resolution, and a projection type. Aspects of determining a projection shape are described herein with respect to FIGS. 3, 6A, 6B, 6C, and 6D, for example.

At operation 1106, the process can include converting points of the at least one multi-dimensional dataset to the projection shape. This operation 1106 may include determining vectors associated with the multi-dimensional data and determining a cell of the projection shape intersected by the data vectors. In some instances, for example, when a data point of the three-dimensional dataset is located on the interior of the projection shape, the operation may include extending a vector associated with the data point to determine an intersection with a cell of the projection shape. In an instance when a data point of the three-dimensional dataset is located external to the projection shape, the operation may include determining which cell of the projection shape is intersected by the vector associated with the data point. Further, the operation 1106 may include storing measurements associated with the three-dimensional dataset within each cell of the projection shape. In some instances, where multiple vectors intersect with a cell, data may be averaged, discarded, a resolution may be increased, etc. In some instances, data corresponding to multiple vectors (and multiple data points, accordingly) may be stored in a single cell.

At operation 1108, the process can include mapping points of the projection shape to a map plane (e.g., a cylinder). For example, the operation 1108 may include determining a projection type or applying a projection type, such as perspective geometry or orthogonal geometry, to map the data in the projection shape to a cylinder.

At operation 1110, the process can include unrolling the map plane (e.g., the cylinder) into a multi-channel image. Examples of this operation 1110 are provided with respect to FIG. 8.

Figure 12:
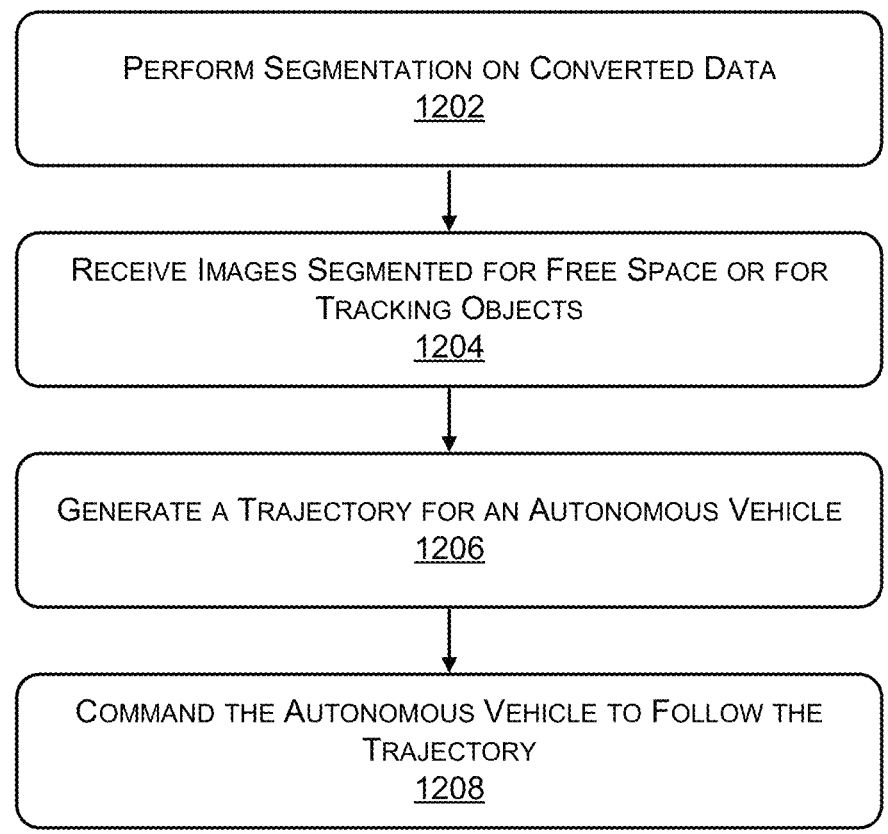
FIG. 12 depicts an example process for generating a trajectory for an autonomous vehicle based on image segmentation, as described herein.

FIG. 12 depicts an example process 1200 for generating a trajectory for an autonomous vehicle based on image segmentation, as discussed herein. For example, some or all of the process 1200 can be performed by one or more components in the architecture 300, or in the environment 1400, as described below.

At operation 1202, the process may include performing segmentation on converted data. For example, the converted data may refer to three-dimensional data that has been converted to a multi-channel two-dimensional image, as described herein. In some instances, the converted data is input into a convolutional neural network that is trained to segment images based on free space (e.g., drivable or navigable space) in the input image. In some instances, the convolutional neural network may identify objects to be tracked by various systems of the autonomous vehicle. As an example, the converted data may be generated from an image capture system (e.g., a perception system) onboard an autonomous vehicle. In some instances, the image capture system may include any number of sensors, including but not limited to image sensors, LIDAR, radar, etc.

At operation 1204, the process may include receiving one or more images that have been segmented to create a set of images segmented for free space, while in some instances, the operation 1004 may include receiving indications of one or more objects identified in the segmented images to perform object tracking and/or object motion prediction. At operation 1206, the process can include inputting the images segmented for free space or inputting the identified and/or tracked objects into a planner system, to generate a trajectory for the autonomous vehicle. In some instances, the planner system may be incorporated into a computing system to receive free space segmented images or to receive objects to be tracked and to generate a trajectory based at least in part on the segmented images or tracked objects. At operation 1208, the process may include generating a sequence of commands to command the autonomous vehicle to drive along the trajectory generated in operation 1206. In some instances, the trajectory generated in the operation 1206 may constrain the operation of the autonomous vehicle to operate within the free space segmented in the operation 1204, or to avoid objects identified and/or tracked by a planner system of the autonomous vehicle. Further, the commands generated in the operation 1208 can be relayed to a controller onboard an autonomous vehicle to control the autonomous vehicle to drive the trajectory. Although discussed in the context of an autonomous vehicle, the process 1200, and the techniques and systems described herein, can be applied to a variety systems utilizing machine vision.

Figure 13:
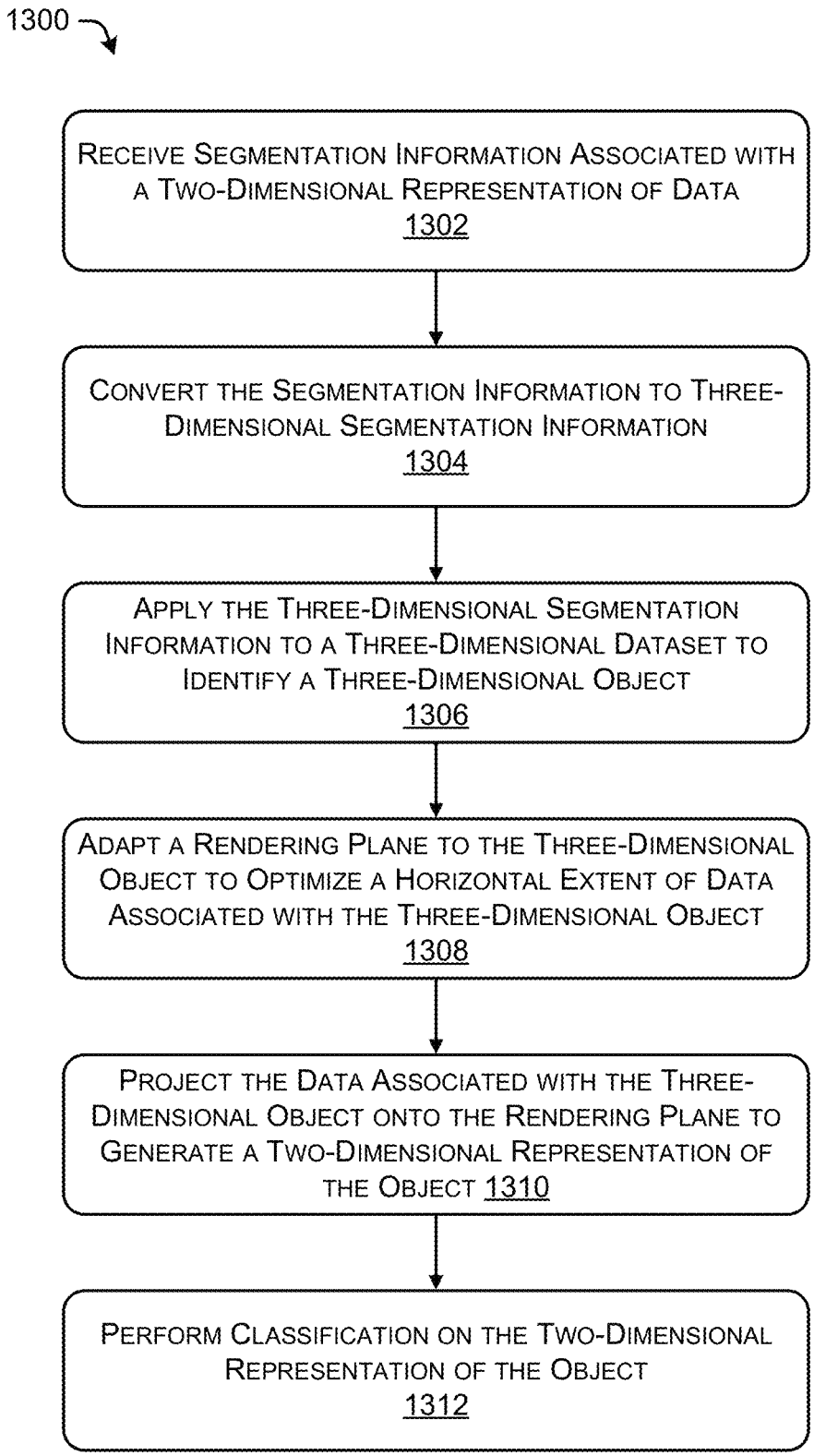
FIG. 13 depicts an example process for receiving segmentation information, adapting a rendering plane for an object, converting three-dimensional data of the object to two-dimensional data of the object, and performing classification.

FIG. 13 depicts an example process 1300 for receiving segmentation information, adapting a rendering plane for the object, converting the three-dimensional data of the object to two-dimensional data of the object, and performing classification. For example, some or all of the process 1300 can be performed by one or more components in the architecture 300, or in the environment 1400, as described below.

At operation 1302, the process can include receiving segmentation information associated with a two-dimensional representation of data. In some instances, the segmentation information can be generated by the processes described in connection with FIGS. 1 and/or 5.

At operation 1304, the process can include converting the segmentation information to three-dimensional segmentation information. For example, the two-dimensional representation of data may be related to three-dimensional data, such as LIDAR data. Thus, the operation 1304 may include associating the two-dimensional segmentation information with the three-dimensional representation of the data, and associating depth information with the segmentation information. In some examples, such segmentation information may include a three dimensional bounding box. In such examples, the three dimensional bounding box may be used to select a portion of the LIDAR data. In some instances, the segmentation information may include segmentation identifications (IDs) associated with each data point, such that a particular segmentation ID is associated with a particular object. Thus, by selecting a particular segmentation ID, data points associated with the segmentation ID can be identified and extracted as a segmented object.

At operation 1306, the process can include applying the three-dimensional segmentation information to a three-dimensional dataset to identify a three-dimensional object. In some instances, the process 1300 may include performing classification on a per-object basis. Thus, the operation 1306 may include identifying, isolating, extracting, and/or segmenting the three-dimensional object from the three-dimensional dataset so that any subsequent processing can be optimized for the particular object. Further, by isolating and/or extracting the three-dimensional object, a performance of a computer may be improved by reducing a dataset or an amount of data required for processing. That is, converting of data and/or classification may be performed on a reduced amount of data.

At operation 1308, the process can include adapting or positioning a rendering plane relative to the three-dimensional object to optimize, for example, a horizontal extent of data associated with the three-dimensional object. In some instances, the operation 1308 may include optimizing a vertical extent of the data in addition to or instead of optimizing the horizontal extent of data. In some instances, this operation 1308 may include orienting the rendering plane to best fit the data associated with the three-dimensional object. In some instances, this operation may include locating a virtual LIDAR sensor at a position and orientation based on a principal component analysis of the segmented data.

At operation 1310, the process can include projecting the data associated with the three-dimensional object onto the rendering plane to generate a two dimensional representation of the object. In some instances, the operation 1310 may include determining a projection type for projecting the data onto the rendering plane. For example, a projection type may utilize perspective geometry with the virtual LIDAR sensor as the focus of the perspective. By way of another example, a projection type may utilize orthogonal geometry for projecting data to the projection plane. In some instances, the rendering plane may include any number of cells, corresponding to a resolution of the rendering plane.

At operation 1312, the process can include performing classification on the two-dimensional representation of the object. For example, as described herein, the operation 1312 may include inputting the two-dimensional representation of the object into a convolutional neural network trained on such projected data.

Figure 14:
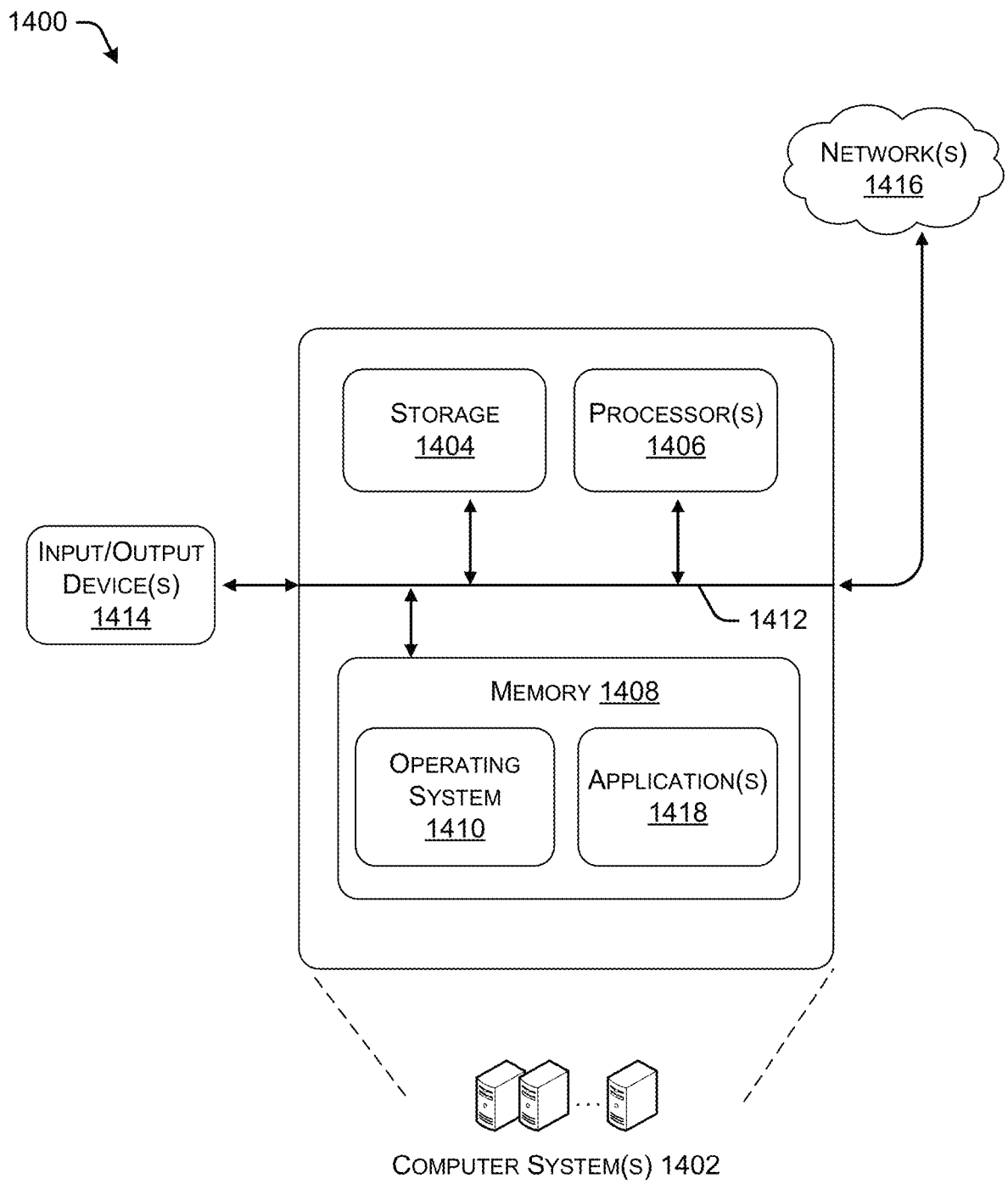
FIG. 14 depicts a block diagram of an example computer system for implementing the techniques described herein.

FIG. 14 illustrates an environment 1400 in which the disclosures may be implemented in whole or in part. The environment 1400 depicts one or more computer systems 1402 that comprise a storage 1404, one or more processor(s) 1406, a memory 1408, and an operating system 1410. The storage 1404, the processor(s) 1406, the memory 1408, and the operating system 1410 may be communicatively coupled over a communication infrastructure 1412. Optionally, the computer system 1402 may interact with a user, or environment, via input/output (I/O) device(s) 1414, as well as one or more other computing devices over a network 1416, via the communication infrastructure 1412. The operating system 1410 may interact with other components to control one or more applications 1418.

In some instances, the computer system(s) 1402 may correspond to the computer system(s) 302 of FIG. 3. Further, the computer system(s) 302 may implement any hardware and/or software to implement the modules 304, 306, 308, 310, 314, 316, 318, 320, and 322 to perform the converting of multi-dimensional data for image analysis, as discussed herein.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods described herein is illustrated in FIG. 14. A processor or computer system can be configured to particularly perform some or all of the methods described herein. In some embodiments, the methods can be partially or fully automated by one or more computers or processors. The systems and methods described herein may be implemented using a combination of any of hardware, firmware and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc. can be stored in tables in the RDBMS. The tables can have predefined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. An example system comprises:
one or more processors; and
one or more computer readable storage media communicatively coupled to the one or more processors and storing instructions that are executable by the one or more processors to:
  receive a three-dimensional dataset captured by at least one LIDAR sensor installed on an autonomous vehicle, the at least one LIDAR sensor associated with a first perspective;
  receive segmentation information associated with the three-dimensional dataset, the segmentation information including, for an individual data point of the three-dimensional dataset, a segmentation identifier associated with a particular object;
  select a portion of the three-dimensional dataset based at least in part on the segmentation identifier;
  extract, as extracted data, the portion of the three-dimensional dataset, wherein the extracted data represents a first width and a first height relative to the first perspective;
  perform a principal component analysis on the extracted data to determine at least a first principal component, a second principal component, and a third principal component of the extracted data;
  position a rendering plane relative to the extracted data based at least in part on the principal component analysis, wherein an orientation of the rendering plane is associated with a second perspective different than the first perspective, wherein the orientation of the rendering plane is selected such that the extracted data represents a second width and a second height relative to the second perspective, and wherein the second width is greater than the first width;
  project, as projected data, the extracted data onto the rendering plane, the projected data representing a two-dimensional representation of the extracted data; and
  perform classification on the projected data to determine an object classification associated with the projected data.

B. The system of example A, wherein a classification function performing the classification includes at least one convolutional neural network to determine the object classification associated with the projected data.

C. The system of example A or example B, wherein the orientation of the rendering plane is selected to substantially maximize the second width associated with the extracted data relative to the rendering plane.

D. The system of any one of example A through example C, wherein the second height is greater than the first height, and wherein the orientation of the rendering plane is selected to substantially maximize the second height associated with the extracted data relative to the rendering plane.

E. The system of any one of example A through example C, wherein the segmentation information is associated with a plurality of objects represented in the three-dimensional dataset, and wherein a first rendering plane is positioned relative to a first object of the plurality of objects and a second rendering plane is positioned relative to a second object of the plurality of objects.

F. The system of any one of example A through example C, wherein the at least one LIDAR sensor includes a plurality of LIDAR sensors, and wherein the three-dimensional dataset includes LIDAR data fused from data captured by the plurality of LIDAR sensors.

G. The system of any one of example A through example C, wherein a size of the rendering plane is based at least in part on an input image size associated with a classification function performing the classification.

H. An example method comprises:
  receiving segmentation information associated with a dataset, the dataset including three-dimensional data captured with respect to a first perspective;
  extracting, as extracted data, a portion of the dataset, wherein the extracting is based at least in part on the segmentation information;
  positioning a rendering plane relative to the extracted data, wherein an orientation of the rendering plane is associated with a second perspective;
  projecting, as projected data, the extracted data onto the rendering plane; and
  performing classification on the projected data to determine an object classification of an object represented in the projected data.

I. The method of example H, wherein the segmentation information includes at least a three-dimensional bounding box, the method further comprising extracting the portion of the three-dimensional dataset bound within the three-dimensional bounding box.

J. The method of example H or example I, wherein the segmentation information includes at least a segmentation identifier associated with individual data points of the dataset, the method further comprising:
  selecting the segmentation identifier from a plurality of segmentation identifiers; and
  extracting, as the extracted data, the portion of the dataset based at least in part on the segmentation identifier.

K. The method of any one of example H through example J, wherein:
  the extracted data represents a first width and a first height relative to the first perspective; and
  wherein the orientation of the rendering plane is selected such that the extracted data represents a second width and a second height relative to the second perspective, and wherein the second width is greater than the first width.

L. The method of any one of example H through example J, wherein the performing the classification on the projected data includes providing the projected data to a convolutional neural network trained to classify objects represented in two-dimensional data.

M. The method of any one of example H through example J, further comprising:
  determining a first variance of the dataset projected onto a plane associated with the first perspective, the first variance associated with an orientation;
  determining a second variance of the dataset projected onto the rendering plane, the second variance associated with the orientation; and
  selecting the orientation of the rendering plane based at least in part on the second variance being higher than the first variance.

N. The method of any one of example H through example J, wherein:
  the positioning the rendering plane relative to the extracted data includes at least performing a principal component analysis on the extracted data; and
  the orientation of the rendering plane is based at least in part on the principal component analysis.

O. The method of any one of example H through example J, wherein the projecting the extracted data onto the rendering plane converts the portion of the three-dimensional dataset into two-dimensional data.

P. The method of any one of example H through example J, wherein the dataset represents at least one of:
  LIDAR data captured by one or more LIDAR sensors; or
  simulated LIDAR data generated by a simulator.

Q. An exemplary system comprises:
  one or more processors; and
  one or more computer readable storage media communicatively coupled to the one or more processors and storing instructions that are executable by the one or more processors to:
    receive segmentation information associated with a dataset, the dataset representing three-dimensional data captured with respect to a first perspective;
    extract, as extracted data, a portion of the dataset, wherein the extracted data is based at least in part on the segmentation information;
    position a rendering plane relative to the extracted data, wherein an orientation of the rendering plane is associated with a second perspective;
    project, as projected data, the extracted data onto the rendering plane; and
    perform classification on the projected data to determine an object classification of an object represented in the projected data.

R. A system of example Q, wherein the second perspective is different than the first perspective.

S. A system of example R, wherein the instructions are further executable by the one or more processors to track the object represented in the projected data based at least in part upon which to generate a trajectory for the autonomous vehicle.

T. A system of example R or example S, wherein:
  the extracted data represents a first width and a first height relative to the first perspective; and
  wherein the orientation of the rendering plane is selected such that the extracted data represents a second width and a second height relative to the second perspective, and wherein the second width is greater than the first width.

What is claimed is:

1. A system comprising:
one or more processors; and
one or more non-transitory computer-readable media storing computer-executable instructions that, when executed, cause the one or more processors to perform operations comprising:
receiving three-dimensional data captured by a lidar sensor, the lidar sensor associated with a first perspective;
receiving segmentation information associated with the three-dimensional data;
positioning a rendering plane relative to the three-dimensional data, wherein an orientation of the rendering plane is associated with a second perspective;
projecting, as projected data and based at least in part on the segmentation information, at least a portion of the three-dimensional data onto the rendering plane; and
associating the projected data with an individual channel of a multi-channel image based at least in part on the segmentation information.

2. The system of claim 1, wherein:
the second perspective is a top-down perspective of an environment associated with the three-dimensional data; and
the projected data is represented as two-dimensional data.

3. The system of claim 1, wherein the segmentation information comprises a segmentation identifier associated with an object.

4. The system of claim 1, the operations further comprising:
determining, based at least in part on the projected data, a trajectory for an autonomous vehicle; and
controlling the autonomous vehicle based at least in part on the trajectory.

5. The system of claim 1, the operations further comprising:
inputting the multi-channel image to a machine learned model.

6. The system of claim 1, the operations further comprising:
associating a bounding box with the projected data.

7. A method comprising:
receiving three-dimensional data captured with respect to a first perspective;
receiving segmentation information associated with the three-dimensional data;
projecting, as projected data and based at least in part on the segmentation information, at least a portion of the three-dimensional data relative to a rendering plane having an orientation associated with a second perspective; and
associating the projected data with an individual channel of a multi-channel image based at least in part on the segmentation information.

8. The method of claim 7, wherein:
the second perspective is a top-down perspective of an environment associated with the three-dimensional data; and
the projected data is represented as two-dimensional data.

9. The method of claim 7, wherein:
the segmentation information comprises a segmentation identifier associated with an object.

10. The method of claim 7, further comprising:
determining, based at least in part on the projected data, a trajectory for an autonomous vehicle; and
controlling the autonomous vehicle based at least in part on the trajectory.

11. The method of claim 7, further comprising:
inputting the multi-channel image to a machine learned model.

12. The method of claim 7, further comprising:
associating a bounding box with the projected data.

13. One or more non-transitory computer-readable media storing instructions executable by a processor, wherein the instructions, when executed, cause the processor to perform operations comprising:
receiving three-dimensional data captured with respect to a first perspective;
receiving segmentation information associated with the three-dimensional data;
projecting, as projected data and based at least in part on the segmentation information, at least a portion of the three-dimensional data relative to a rendering plane having an orientation associated with a second perspective; and
associating the projected data with an individual channel of a multi-channel image based at least in part on the segmentation information.

14. The one or more non-transitory computer-readable media of claim 13, wherein:
the second perspective is a top-down perspective of an environment associated with the three-dimensional data; and
the projected data is represented as two-dimensional data.

15. The one or more non-transitory computer-readable media of claim 13, where the segmentation information comprises a segmentation identifier associated with an object.

16. The one or more non-transitory computer-readable media of claim 13, the operations further comprising:
determining, based at least in part on the projected data, a trajectory for an autonomous vehicle; and
controlling the autonomous vehicle based at least in part on the trajectory.

17. The one or more non-transitory computer-readable media of claim 13, the operations further comprising:
inputting the multi-channel image to a machine learned model.

18. The one or more non-transitory computer-readable media of claim 13, the operations further comprising:
associating a bounding box with the projected data.

19. The system of claim 1, the operations further comprising:
performing classification on the projected data to determine an object classification of an object represented in the projected data.

20. The system of claim 1, wherein an extent of an object represented in the three-dimensional data is represented in the individual channel.

* * * * *